United States Patent
Leonard

(10) Patent No.: US 9,770,958 B2
(45) Date of Patent: Sep. 26, 2017

(54) GAS SPRING ASSEMBLIES AND INTERNAL MISALIGNMENT MOUNTS FOR SAME

(71) Applicant: Firestone Industrial Products Company, LLC, Indianapolis, IN (US)

(72) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/888,525

(22) PCT Filed: May 1, 2014

(86) PCT No.: PCT/US2014/036386
§ 371 (c)(1),
(2) Date: Nov. 2, 2015

(87) PCT Pub. No.: WO2014/179581
PCT Pub. Date: Nov. 6, 2014

(65) Prior Publication Data
US 2016/0101663 A1 Apr. 14, 2016

Related U.S. Application Data

(60) Provisional application No. 61/818,429, filed on May 1, 2013.

(51) Int. Cl.
*F16F 9/084* (2006.01)
*B60G 15/12* (2006.01)
*F16F 9/04* (2006.01)

(52) U.S. Cl.
CPC ............ *B60G 15/12* (2013.01); *F16F 9/0472* (2013.01); *F16F 9/084* (2013.01);
(Continued)

(58) Field of Classification Search
CPC ........ F16F 9/0472; F16F 9/084; B60G 15/12; B60G 2202/314; B60G 2204/126
(Continued)

(56) References Cited

U.S. PATENT DOCUMENTS

| | | | | |
|---|---|---|---|---|
| 4,647,025 A | * | 3/1987 | Gold ...................... | B60G 15/12 267/122 |
| 6,089,552 A | * | 7/2000 | Pahl ....................... | B60G 11/28 267/64.21 |

(Continued)

FOREIGN PATENT DOCUMENTS

| | | |
|---|---|---|
| DE | 24 03 806 | 8/1974 |
| DE | 197 04 433 | 8/1998 |

(Continued)

OTHER PUBLICATIONS

International Search Report and Written Opinion for corresponding patent application No. PCT/US2014/036386 dated Sep. 5, 2014.

*Primary Examiner* — Thomas Irvin
(74) *Attorney, Agent, or Firm* — Thomas R. Kingsbury; Fay Sharpe LLP

(57) ABSTRACT

An assembly (AS1) in accordance with the subject matter of the present disclosure can include a gas spring (200), an internally-mounted device (300) and a mounting assembly (400, 500) operatively connecting the internally-mounted device to an end member (202, 204) of the gas spring (200). The mounting assembly (400, 500) can permit at least a portion of the internally-mounted device to undergo 360 degree rotational and pivotal displacement relative the end member (202, 204) of the as spring (200). The mounting assembly (400, 500) can include a device mount (402, 502) that can be operatively secured to the internally-mounted device (300) and a retainer (404, 504) that is secured to the end member (202, 204) and operatively retains the device mount (402, 502) adjacent the end member (202, 204). The (Continued)

FIG. 13 device mount (402, 502) and the retainer (404, 504) can include complimentary semi-spherical surfaces that permit the relative movement between internally-mounted device (300) and the end member (202, 204) of the gas spring (200).

16 Claims, 18 Drawing Sheets

(52) U.S. Cl.
CPC .. *B60G 2202/314* (2013.01); *B60G 2204/126* (2013.01); *F16F 2230/0052* (2013.01)

(58) Field of Classification Search
USPC ................................ 267/64.21, 64.24, 64.27
See application file for complete search history.

(56) References Cited

U.S. PATENT DOCUMENTS

| | | | | |
|---|---|---|---|---|
| 6,286,820 B1* | 9/2001 | Raulf | ................... | B60G 15/14 267/64.21 |
| 7,487,957 B2* | 2/2009 | Brunneke | .............. | B60G 15/14 188/321.11 |
| 9,259,985 B2* | 2/2016 | Leonard | ................. | B60G 11/27 |
| 9,352,632 B2* | 5/2016 | Leonard | .................... | F16F 7/09 |
| 9,370,984 B2* | 6/2016 | Leonard | ................. | B60G 11/62 |
| 2003/0057618 A1 | 3/2003 | Tanner | | |
| 2007/0246316 A1 | 10/2007 | Brunneke | | |
| 2013/0207329 A1* | 8/2013 | Leonard | ................. | B60G 11/62 267/220 |
| 2013/0234377 A1* | 9/2013 | Leonard | ................. | B60G 15/00 267/219 |
| 2014/0070468 A1* | 3/2014 | Leonard | ................. | B60G 11/27 267/64.27 |
| 2015/0008627 A1* | 1/2015 | Leonard | .................... | F16F 7/09 267/64.24 |
| 2015/0217617 A1* | 8/2015 | Leonard | ................. | B60G 11/62 280/124.16 |
| 2016/0121682 A1* | 5/2016 | Leonard | ................. | F16F 9/049 280/124.161 |

FOREIGN PATENT DOCUMENTS

| | | |
|---|---|---|
| DE | 10 2005 060332 | 2/2007 |
| WO | WO 2012/054520 | 4/2012 |

* cited by examiner

GAS SPRING ASSEMBLIES AND INTERNAL MISALIGNMENT MOUNTS FOR SAME

BACKGROUND

The present disclosure broadly relates to the art of spring devices and, more particularly, to internal misalignment mounts dimensioned for operative connection to an end member of a gas spring assembly, as well as a gas spring assemblies including one or more of such internal misalignment mounts and suspension systems that include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be in any way limited the applications and/or uses shown and described herein, which are merely exemplary.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Vehicle suspension systems of a wide variety of types and kinds have been developed and are commonly used. Components of such vehicle suspension systems are often secured between opposing structural members that move relative to one another during travel between jounce and rebound conditions. In many cases, the structural members rotate or are otherwise angularly displaced relative to one another during such travel between jounce and rebound conditions. As such, suspension system components, such as damping devices and spring devices, for example, are mounted or otherwise secured between the structural members, or otherwise configured, such that the rotational or otherwise angular displacement can be accommodated. For example, damping members are commonly pivotally mounted between the structural members so that side loading of the damping members can be avoided. As another example, spring devices are commonly secured between the structural members such that the natural flexibility of the spring devices can accommodate the non-linear displacement.

In some cases, however, a damping device may be disposed within the spring chamber of a gas spring device and can often be substantially-rigidly affixed to the end members of the gas spring device. In such cases, the substantially linear travel that is typically associated with damping devices can inhibit the inherent flexibility of the gas spring device as the suspension system is displaced through an arcuate motion associated with movement between jounce and rebound conditions. Additionally, the inherent flexibility of gas spring devices can permit bending and/or side loads induced by such movements to be communicated to the damping device thereof. Such conditions can undesirably influence performance of the damping device, the gas spring device and, in many cases, the performance of the damping device and gas spring combination.

Notwithstanding the common use and overall success of known gas spring and damper constructions, it is believed that a need exists to meet the aforementioned competing goals while still retaining comparable or improved performance, low cost of manufacture, ease of assembly and/or other desired features of gas spring and damper assemblies and/or components thereof, and/or to otherwise advance the art of spring devices.

BRIEF SUMMARY

One example of an assembly in accordance with the subject matter of the present disclosure can include a gas spring assembly that includes a first end member, a second end member spaced apart from the first end member and a flexible wall secured between the first and second end members that at least partially defines a spring chamber therebetween. An internally-mounted device can be disposed within the spring chamber and can extend between opposing ends. At least one of the ends can be secured on or along an end member of the gas spring assembly using an internal misalignment mount.

Another example of an assembly in accordance with the subject matter of the present disclosure can include a gas spring, an internally-mounted device and a mounting assembly. The gas spring can include a flexible spring member that has a longitudinal axis. The flexible spring member can extend longitudinally between first and second ends and peripherally about the longitudinal axis to at least partially define a spring chamber. A first end member can be secured in a substantially fluid-tight manner across the first end. A second end member can be disposed in spaced relation to the first end member and can be secured in a substantially fluid-tight manner across the second end. The internally-mounted device can be at least partially disposed within the spring chamber of the gas spring and can be operatively connected between the first and second end members. The first mounting assembly can operatively connect the internally-mounted device to one of the first and second end members such that the internally-mounted device can undergo 360 degree pivotal and rotational displacement relative to the one of the first and second end members.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
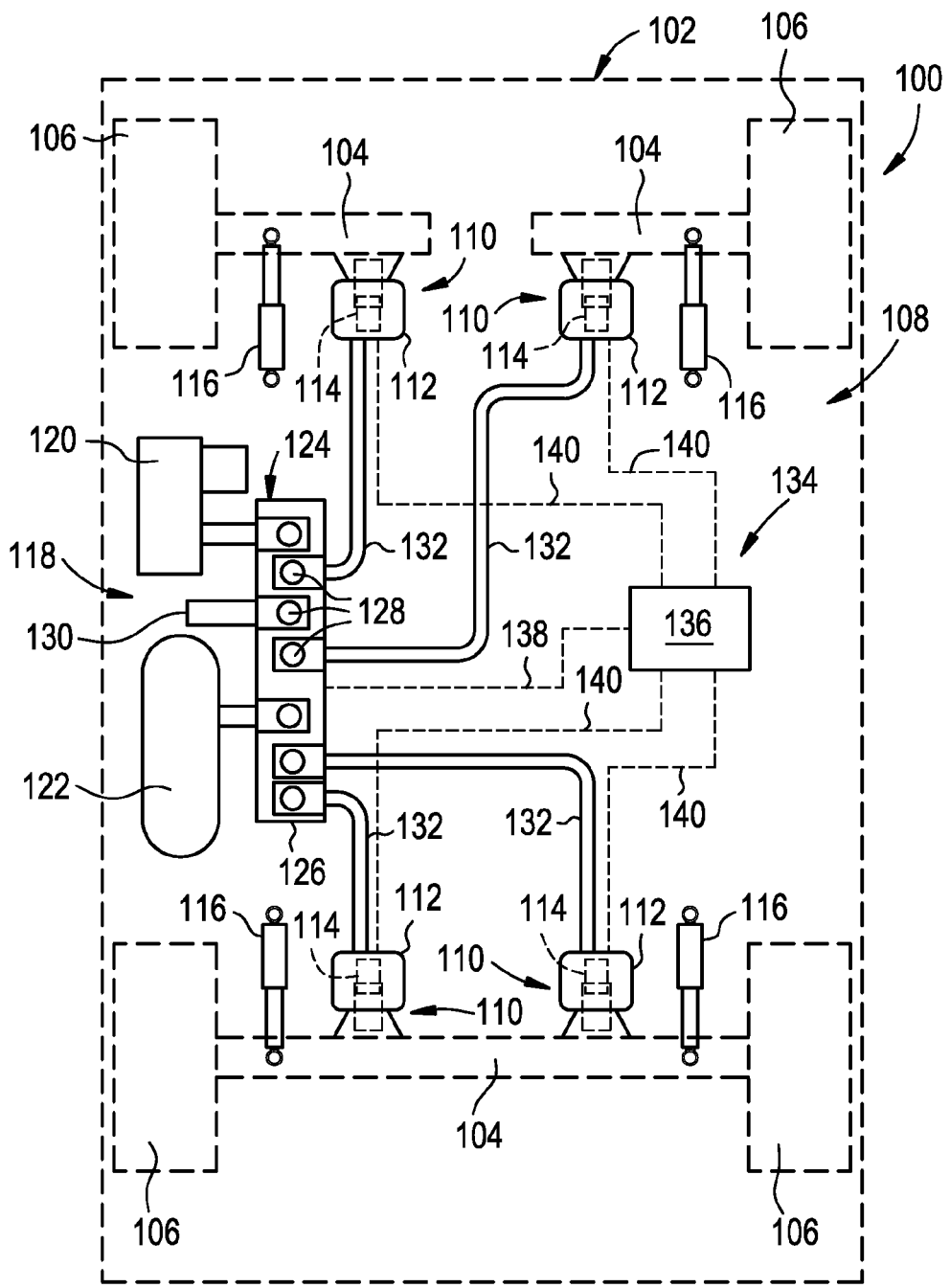
FIG. 1 is a schematic representation of one example of a suspension system that includes assemblies having an internal misalignment mount in accordance with the subject matter of the present disclosure.

FIG. 1 schematically represents a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of assemblies 110 that are operatively connected between the sprung and unsprung masses of the vehicle. Assemblies 110 can include a gas spring (or gas spring assembly) 112 and an internally-mounted device 114 that is at least partially supported within the gas spring using one or more internal misalignment mounts (not shown in FIG. 1). In a preferred arrangement, one or more of the internal misalignment mounts can be of a type that is capable of substantially non-resilient deflection.

Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system can, optionally, include one or more damping members 116 of a typical construction that are provided separately from assemblies 110 and secured between the sprung and unsprung masses in a conventional manner. In other cases, however, internally-mounted device 114 of assemblies 110 can take the form of a damping member (e.g., a damping device that utilizes pressurized gas and/or pressurized liquid as a working medium) that is sized, configured and operative to provide the desired performance characteristics for the suspension system without the use of damping members 116 (e.g., conventional struts or shock absorbers) that are separately provided.

Vehicle 100 also includes a pressurized gas system 118 that is in communication with assemblies 110 and that is operative to selectively supply pressurized gas thereto and exhaust pressurized gas therefrom. Pressurized gas system 118 can include a pressurized gas source, such as a compressor 120, and can optionally include a storage vessel, such as a reservoir 122, for example, for receiving and storing pressurized gas, such as may be generated by the pressurized gas source.

A control device, such as a valve assembly 124, for example, is shown as being in communication with compressor 120 and reservoir 122, and can be of any suitable configuration or arrangement. In the exemplary embodiment shown, valve assembly 124 includes a valve block 126 with a plurality of valves 128 supported thereon. Valve assembly 124 can also optionally include a suitable exhaust, such as a muffler 130, for example, for venting pressurized gas from the system. Valve assembly 124 is shown as being in communication with assemblies 110 through suitable gas transfer lines 132. As such, pressurized gas can be selectively transferred into and/or out of the assemblies through valve assembly 124 by selectively operating valves 128, such as to alter or maintain vehicle height at one or more corners of the vehicle, for example.

It will be appreciated that assemblies 110 can take any suitable form, configuration and/or construction in accordance with the subject matter of the present disclosure. In the arrangement shown in FIG. 1, for example, assemblies 110 can include gas spring assembly 112, an internally-mounted device 114 and at least one internal misalignment mount that operatively interconnects the gas spring assembly and the internally-mounted device. It will be appreciated that internally-mounted device 114 can be a device, component and/or system of any suitable type, kind, configuration and/or construction. Non-limiting examples of such devices, components and/or systems can include rebound limiters, sensing devices and damping members that utilize liquid, pressurized gas or a combination thereof as a working medium (e.g., conventional hydraulic dampers, pressurized gas dampers). In some cases, the internally-mounted device can be substantially-entirely contained within gas spring assembly 112.

Gas spring assemblies 112 include opposing end members as well as a flexible wall secured between the end members to form a spring chamber that is operative to receive and retain a quantity of pressurized gas. Internally-mounted devices 114 can include a plurality of components that are displaceable relative to one another with one component secured to one end member and another component secured to the other end member. Additionally, at least one of the components can be secured to an end member using an internal misalignment mount in accordance with the subject matter of the present disclosure.

In operation of the exemplary embodiment shown in FIG. 1, valve assembly 124 can be selectively actuated to transfer pressurized gas from the compressor and/or the reservoir to one or more of assemblies 110 via one or more of gas transfer lines 132. Additionally, valve assembly 124 can be selectively actuated to exhaust pressurized gas from one or more of the assemblies through the gas transfer lines, such as by way of muffler 130 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a control system 134 for selectively operating, adjusting and/or otherwise influencing and/or controlling the performance of one or more suspension system components, such as assemblies 110 and/or pressurized gas system 118, for example. Control system 134 can include an electronic control unit 136 in communication with compressor 120 and/or one or more components of valve assembly 124, such as through a communication line 138, for example, for selective actuation and/or operation thereof. Electronic control unit 136 is also shown in FIG. 1 as being in communication with suitable height sensing devices (not shown in FIG. 1) that can optionally be used in operative association with assemblies 110. It will be appreciated that such communications can be implemented in any suitable manner, such as by way of communication lines 140, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 134, such as pressure sensors, accelerometers and/or temperature sensors, for example.

Assemblies in accordance with the subject matter of the present disclosure can include a gas spring assembly and an internally-mounted device that can be secured between opposing end members of the gas spring assembly using at least one internal misalignment mount capable of undergoing angular deflection. In some cases, an internal misalignment mount may be of a type that is capable of substantially non-resilient deflection. In other cases, a misalignment mount may be of a type that is capable of spring-biased or resilient deflection. As indicated above, terms such as "internally-mounted device" and the like broadly refer to a device, component and/or system of any suitable type, kind, configuration and/or construction that is or can be secured between opposing end members of a gas spring assembly, whether wholly or only partially disposed within the spring chamber of the gas spring assembly.

One example of an assembly AS1 in accordance with the subject matter of the present disclosure, such as may be suitable for use as assemblies 110 in FIG. 1, for example, is shown in FIGS. 2-11. Assembly AS1 can include a gas spring assembly 200, an internally-mounted device in the form of a gas damper assembly 300 as well as at least one mounting assembly, such as one or more of a mounting assembly 400 and/or a mounting assembly 500. In the arrangement shown, mounting assembly 400 operatively connects one end of gas damper assembly 300 to an end member of gas spring assembly 200, and mounting assembly 500 operatively connects another end of gas damper assembly 300 to another end member of gas spring assembly 200. It will be appreciated, however, that an assembly in accordance with the subject matter of the present disclosure can include one or more mounting assemblies. As such, it will be recognized and understood that either one of mounting assemblies 400 and 500, or in the alternative one or more of mounting assemblies 600 and/or 700 as will be described hereinafter, can be optionally included.

Gas spring assembly 200, which may also be referred to herein as a gas spring and may be suitable for use as gas spring 112 in FIG. 1, can be of any type, kind, construction, configuration and/or arrangement, such as is shown in FIGS. 1-7, 12, 15 and 16 as being of a rolling lobe-type construction, for example. It will be appreciated, however, that other gas spring assembly constructions could alternately be used, such as convoluted bellow-type constructions, for example. Generally, a gas spring assembly, such as gas spring assembly 200, for example, can have a longitudinal axis and can include a first end member, an opposing second end member that is spaced longitudinally from the first end member and a flexible wall that is operatively connected therebetween to at least partially define a spring chamber.

Figure 2:
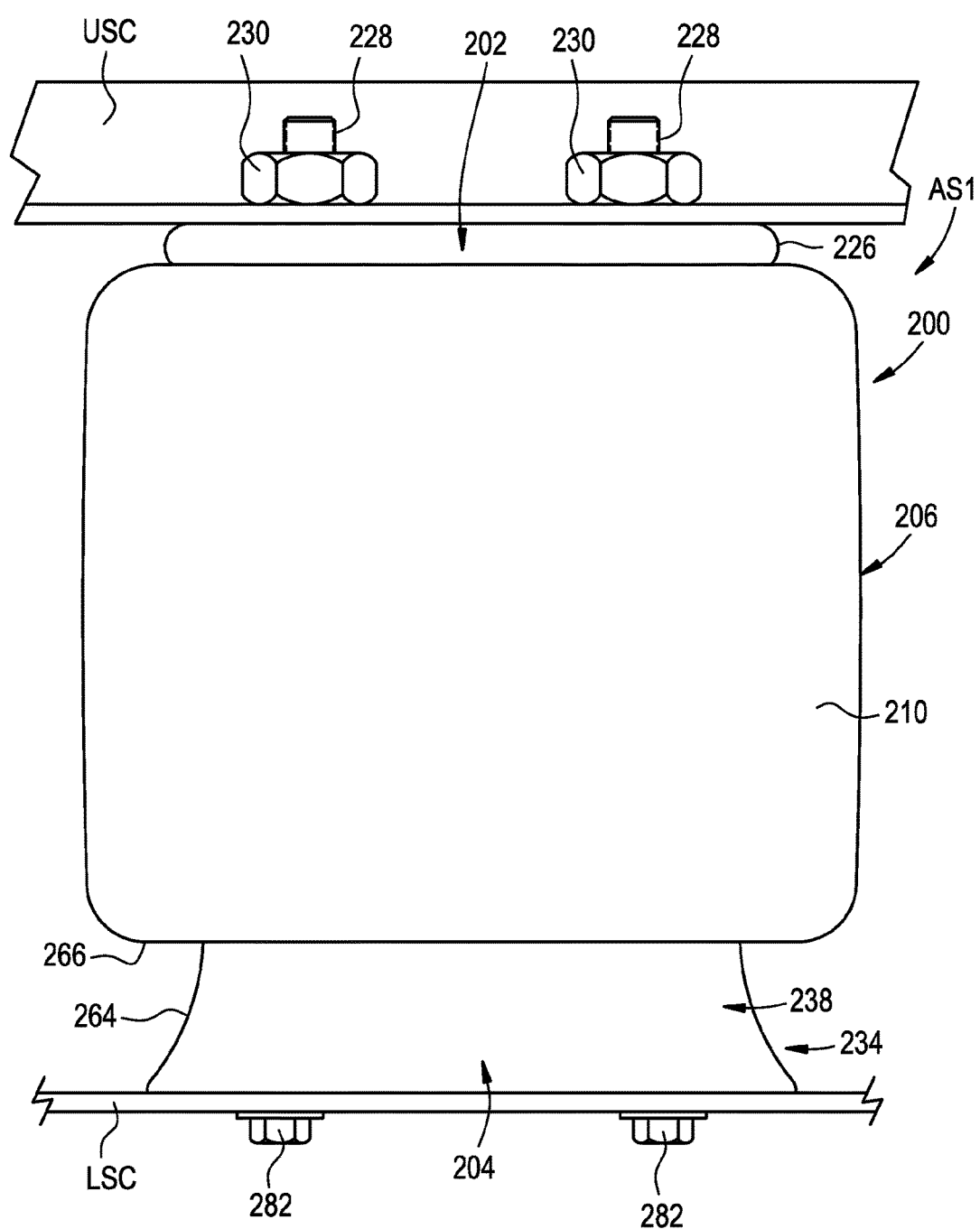
FIG. 2 is a side elevation view of one example of an assembly including an internal misalignment mount in accordance with the subject matter of the present disclosure.
Figure 3:
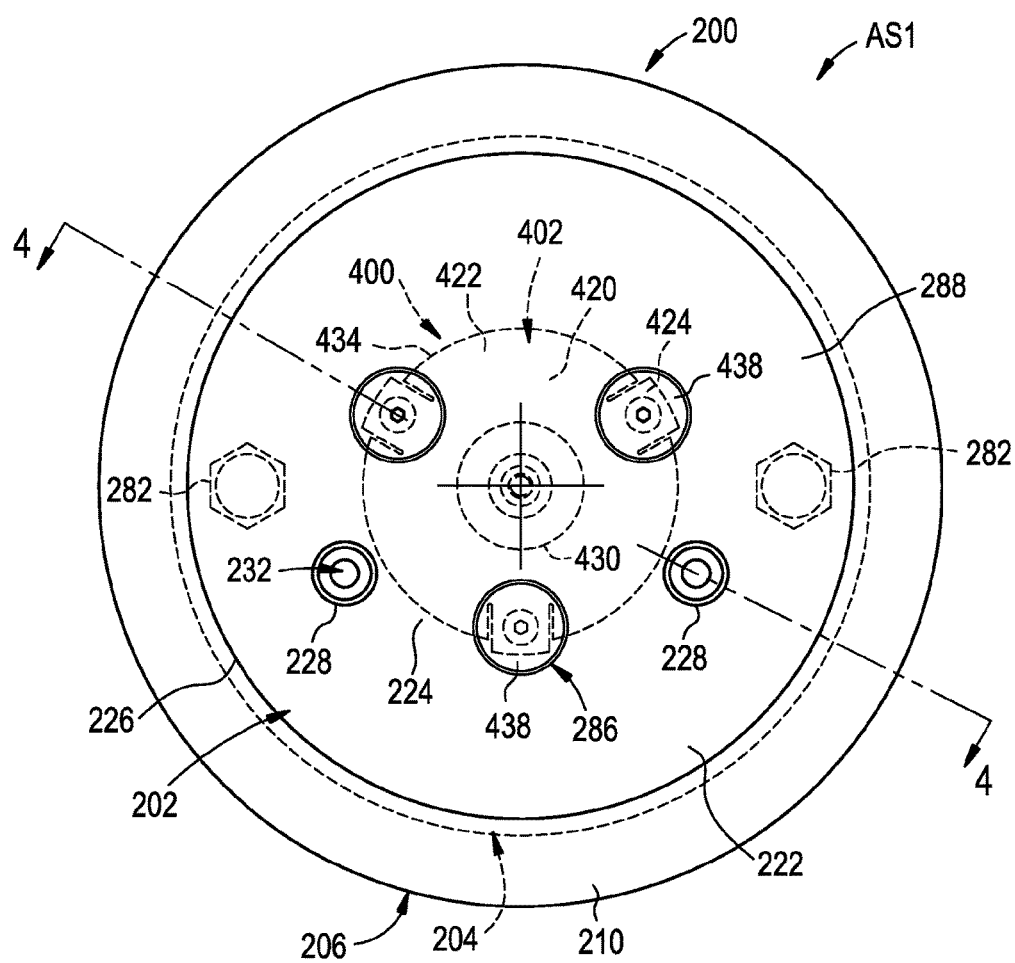
FIG. 3 is a top plan view of the assembly shown in FIG. 2.

Assembly AS1 can be operatively connected between opposing structural components in any suitable manner. As one example, assembly AS1 is shown in FIG. 2 as being disposed between an upper structural component USC, which can be representative of vehicle body 102 in FIG. 1, for example, and a lower structural component LSC, which can be representative of axle 104 in FIG. 1, for example. Additionally, it will be appreciated that the assembly can be secured on, along or otherwise between the associated structural components in any suitable manner.

In the exemplary arrangement shown in FIGS. 2-7, 12, 15 and 16, gas spring assembly 200 is shown as having a longitudinally-extending axis AX and including an end member 202, such as a bead plate, for example, and an end member 204, such as a piston (or roll-off piston), for example, that is spaced longitudinally from end member 202. A flexible spring member 206 can be secured between end members 202 and 204 such that a spring chamber 208 can be at least partially formed therebetween.

Flexible spring member 206 can include a flexible wall 210 that extends peripherally about axis AX and in a generally longitudinal manner between an end 212 and an end 214. Flexible spring member 206 can also include a mounting bead 216 along sleeve end 212 and/or a mounting bead 218 along sleeve end 214, such as is identified in FIGS. 4 and 6, for example. Mounting beads 216 and 218, if provided, can optionally include a reinforcing element or other suitable component, such as a bead wire 220, for example.

End 212 of flexible spring member 206 can be secured on or along the end member in any suitable manner. For example, end member 202 can include an end member wall 222 having a central wall portion 224 and an outer peripheral wall portion 226. In some cases, outer peripheral wall portion 226 can be crimped or otherwise deformed at least partially around mounting bead 216 of the flexible spring member such that the mounting bead can be captured and retained in a substantially fluid-tight manner by the outer peripheral wall portion of end member 202.

One or more securement devices, such as mounting studs 228, for example, can be included along end member 202 and can project through the associated structural component (e.g., upper structural component USC) in a manner suitable for receiving a corresponding securement device or element to secure the first end member on or along the associated structural component. In the exemplary embodiment shown in FIG. 2, mounting studs 228 project axially outwardly from the end member and extend through holes HLS in upper structural component USC to receive threaded nuts 230. It will be appreciated, however, that other configurations and/or arrangements could alternately be used.

Additionally, a fluid communication port can optionally be provided on, along or otherwise through end member 202 to permit fluid communication with spring chamber 208. In the exemplary embodiment shown, a fluid passage 232 extends through one of mounting studs 228 and is in fluid communication with the spring chamber. It will be appreciated, however, that any other suitable fluid communication arrangement could alternately be used.

End 214 of flexible spring member 206 can be secured on or along end member 204 in any suitable manner. As one example, the mounting bead of the end could be retained on or along the end member using one or more retaining elements or components (e.g., crimp rings or end closures). As another example, mounting bead 218 could be friction fit along a wall portion of the end member and, optionally, at least partially retained thereon using a radially outwardly-extending projection or other similar feature. It will be appreciated, however, that any other suitable arrangement and/or configuration could alternately be used.

In the exemplary embodiment in FIGS. 4-7, 12 and 15, for example, end member 204 is shown as including a body 234 that is formed from a base member 236 and an outer shell 238, which is operatively connected to the base member such that a substantially fluid-tight seal is formed therebetween, such as through the use of a flowed-material joint 240 extending peripherally about axis AX, for example. It will be appreciated, however, that in other cases, a body could be used in which the base member and outer shell are integrally formed with one another, such as may be formed by way of an injection molding process, for example. In such case, the base member could be alternately referred to as a base portion or base member portion, and the outer shell could be alternately referred to as an outer shell portion.

As identified in FIGS. 4-7, 12 and 15, outer shell (or outer shell portion) 238 can include a shell wall 242 that extends peripherally about axis AX. Shell wall 242 can include an outer side wall portion 244 that extends in a generally longitudinal direction between an end 246, which is disposed toward end member 202, and an end 248, which is disposed in longitudinally spaced relation to end 246 and toward lower structural component LSC. Shell wall 242 can also include an end wall portion 250 that transitions into outer side wall portion 244 at a curved or shoulder portion 252. An inner side wall portion 254 projects from end wall portion 250 in a direction extending axially away from end 248. Inner side wall portion 254 terminates in the axial direction at a distal end 256. Additionally, inner side wall portion 254 can include an outer surface (not numbered) facing radially outward and an inner surface 258 facing radially inward. A projection 260 can, optionally, extend in a radially-outward direction from along the outer surface adjacent distal end 256 of inner side wall portion 254.

It will be recognized that a wide variety of shapes, profiles and/or configurations can and have been used in forming the outer side wall of an end member, such as end member 204. As such, it will be appreciated that outer side wall portion 244 of shell wall 242 can be of any suitable size, shape, profile and/or configuration and that the profile shown in FIGS. 2, 4-7, 12 and 15 is merely exemplary.

Mounting bead 218 of flexible spring member 206 can be received on or along the outer surface of inner side wall portion 254 such that a substantially fluid-tight seal is formed therebetween. In some cases, projection 260, if provided, can at least partially retaining mounting bead 218 on or along inner side wall portion 254. Additionally, outer side wall portion 244 of shell wall 242 can include an inside surface 262 and an outside surface 264. As such, a portion of flexible spring member 206 extends along end wall portion 250 and along outside surface 264 of outer side wall portion 244 such that a rolling lobe 266 is formed along body 234 and is displaced along the outer side wall portion as the gas spring assembly undergoes changes in overall height.

Base member 236 includes an inside surface 268 and an outside surface 270, which can be disposed in abutting engagement with lower structural component LSC. Inside surface 268 of base member 236 and inside surface 262 of outer side wall portion 244 at least partially define a chamber 272 within end member 204. Inner surface 258 of inner side wall portion 254 at least partially defines an opening or passage 274 into end member 204 by which chamber 272 can be in fluid communication with spring chamber 208. In a preferred arrangement, inner surface 258 defines an opening or passage (e.g., passage 274) into chamber 272 that is of sufficient size to permit chamber 272 and spring chamber 208 to operate as a substantially unified fluid chamber. That is, in a preferred arrangement, passage 274 can be sufficiently large that minimal fluid flow restriction (e.g., approximate zero fluid flow restriction) will occur for pressurized gas flowing between spring chamber 208 and chamber 272 under typical conditions of operation. It will be appreciated, however, that other configurations and/or arrangements could alternately be used.

Additionally, it will be appreciated that end member 204 can be secured on or along the associated structural component (e.g., lower structural component LSC) in any suitable manner. As one example, one or more holes 276 can extend through base member 238 and one or more securement devices, such as threaded nuts 278, for example, can be accessible through holes 276, such as is illustrated in FIGS. 4-7, 12 and 15, for example. It will be appreciated that threaded nuts 278 can be secured on or along base member 238 in any suitable manner, such as by way of a flowed-material joint 280, for example. One or more securement devices, such as threaded fasteners 282 can extend through the associated structural component and cooperatively interengage the threaded nuts or other securement devices to operatively secure the end member on or along the associated structural component. It will be appreciated, however, that other configurations and/or arrangements could alternately be used.

Gas spring assembly 200 can also include any one or more features, components and/or elements suitable for securement of an internally-mounted device to at least one of the end members of the gas spring assembly. It will be appreciated that any suitable combination of such one or more features, components and/or elements could be used. For example, end member 202 is shown in FIGS. 4-7, 12 and 15 as including one or more recess wall portions 284 that at least partially define a corresponding number of one or more recesses 286 extending into end member wall 222 from along an outer surface 288 thereof. In a preferred arrangement, the one or more recesses can be dimensioned to receive at least a portion of a fastener or other securement device suitable for attachment of an internally-mounted device on or along end member 202. The one or more recess wall portions can also at least partially define a corresponding number of one or more holes or passages 290 extending through end member wall 222, such as may be dimensioned or otherwise adapted to receive a securement device and/or other feature of an associated internal misalignment mount, for example. As another example, end member 204 is shown in FIGS. 4-9 and 12-18 as including one or more holes or passages 292 extending through base member 236, such as may be dimensioned or otherwise adapted to receive a securement device and/or other feature of an associated internal misalignment mount, for example.

As indicated above, an assembly in accordance with the subject matter of the present disclosure can include an internally-mounted device, such as a hydraulic damper, a rebound limiter or a spring aid, for example. Gas damper assembly 300 is shown in FIGS. 3-18 as being another example of an internally-mounted device, and can, optionally, be substantially entirely contained within gas spring assembly 200, such as is shown in FIGS. 3-18, for example. Gas damper assembly 300 has an internally-mounted device axis AXD and extends longitudinally between an end 302 that is operatively connected to end member 202 of gas spring assembly 200 and an end 304 that is operatively connected to end member 204 of gas spring assembly 200. It will be appreciated that one or more of ends 302 and 304 can be operatively connected to a corresponding end member in any suitable manner, such as by way of an internal misalignment mount, as will be described hereinafter.

In the exemplary arrangement in FIGS. 4-7, 12 and 15, gas damper assembly 300 is shown as including damper elements 306 and 308 that are operatively interconnected with one another for telescopic extension and compression. Damper element 306 is operatively connected to end member 202 and extends from the end member toward end member 204. Damper element 308 is operatively connected to end member 204 and extends from the end member toward end member 202. Damper elements 306 and 308 are operatively interengaged with one another such that the damper elements can move relative to one another through telescopic extension and compression.

As identified in FIGS. 4-7, 12 and 15, damper element 306 includes a damper rod 310 that extends longitudinally from an end 312 to an end 314. End 312 of damper rod 310 can include a connection feature dimensioned for securement on or along a component of an associated internal misalignment mount. As one example, damper rod 310 can include a threaded passage 316 extending into the damper rod from along end 312. A damper piston 318 can be disposed along end 314 of damper rod 310 and can be attached or otherwise connected thereto in any suitable manner. For example, the damper piston could be integrally formed with the damper rod. As another example, end 314 of damper rod 310 could include a securement feature, such as a threaded passage 320, for example. In such case, damper piston 318 could be provided separately and could include a hole 322 extending therethrough such that a securement device, such as a threaded fastener 324, for example, could be used to secure damper piston 318 along end 314 of damper rod 310.

With reference to FIGS. 4-7, 12 and 15, damper element 308 includes a side wall 326 extending peripherally (e.g., circumferentially) about axis AXD and an end wall 328 that extends generally transverse to axis AXD. Damper element 308 extends between longitudinally-spaced ends 330 and 332, and extends peripherally about axis AXD such that a longitudinally-extending damping chamber 334 can be at least partially formed by side wall 326 and end wall 328. Additionally, end wall 328 can include a passage wall 336 that at least partially defines a damper passage (not numbered) extending through the end wall.

In some cases, side wall 326 can at least partially define an open end (not identified) of damper element 308 opposite end wall 328. In such cases, side wall 326 can include a connection feature dimensioned for securement on or along a mounting base of an associated internal misalignment mount, such as, for example, has been described hereinafter, for example. As one example of a suitable arrangement, side wall 326 can include one or more helical threads 338 disposed therealong toward end 332. A mounting base of an associated internal misalignment mount can include a corresponding connection feature, such as one or more helical threads, and can be secured together with damper element 308 to connect the damper element on or along an associated structural component (e.g., lower structural component LSC).

As discussed above, damper elements 306 and 308 are operatively interengaged with one another for telescopic extension and compression. In the exemplary arrangement shown, damper piston 318 is disposed within damping chamber 334 and damper rod 310 extends out of damping chamber 334 through the rod passage (not numbered) that is at least partially defined by passage wall 336. As such, end 312 of damper rod 310 is disposed outwardly of damping chamber 334 and can be operatively connected along end member 202 in a suitable manner, such as by way of internal misalignment mount 400, for example, as will be described in additional detail hereinafter.

As identified in FIGS. 4-7, 10-15, 17 and 18, damping chamber 334 is separated by damper piston 318 into chamber portions 334A and 334B. In some cases, it may be desirable to maintain chamber portions 334A and 334B in fluidic isolation from one another, such as by including one or more sealing elements (not shown) operatively disposed between damper piston 318 and side wall 326. Additionally, it may be desirable to include one or more sealing elements (not shown) between damper rod 310 and passage wall 336, such that a substantially fluid-tight seal is formed therebetween and such that damping chamber 334 and spring chamber 208 are fluidically isolated from one another through the rod passage. In some cases, one or more additional fluid communication ports can be provided in the damper piston. And, in other cases, one or more additional fluid communication ports can be provided on or along an end wall or side wall of damper element 308.

For example, end wall 328 can include one or more passages or ports 340 and/or 342 extending therethrough that permit pressurized gas transfer into, out of and/or otherwise between chamber 272 and/or spring chamber 208 and chamber portion 334A of damping chamber 334. As another example, side wall 326 can include one or more passages or ports 344 extending therethrough that permit pressurized gas transfer into, out of and/or otherwise between chamber 272 and/or spring chamber 208 and chamber portion 334B of damping chamber 334. Furthermore, one or more of such passages or ports can optionally include a flow control device that can operate to selectively restrict pressurized gas flow through the corresponding passage or port to flow in at least one direction. For example, end wall 328 includes port 342 that extends therethrough, and a unidirectional or single-direction flow control valve 346 of a suitable type, kind and/or construction can be disposed on or along the end wall portion and can, if provided, substantially restrict pressurized gas flow to a single direction. In the exemplary arrangement shown in FIGS. 4-7, 12 and 15, valve 346 is fluidically associated with passage 342 and permits pressurized gas transfer into chamber portion 334A through passage 342 while substantially inhibiting pressurized gas transfer out of chamber portion 334A through passage 342. As such, in the exemplary arrangement shown, pressurized gas transfer out of chamber portion 334A occurs only through the remaining one or more of passages 340. Additionally, it will be appreciated that such one or more communication passages or ports can be sized and configured to generate damping forces during relative movement between damper element 306 and damper element 308.

It will be recognized that significant frictional forces may be generated by the sealing arrangements described above in connection with the interface between damper piston 318 and side wall 326 as well as in connection with the interface between damper rod 310 and passage wall 336. In some cases, it may be desirable to avoid or at least reduce such frictional forces (or for other reasons) by forgoing the use of sealing elements along the interface between damper piston 318 and side wall 326 and/or along the interface between damper rod 310 and passage wall 336. In such cases, one or more friction reducing bushings or wear bands can, optionally, be disposed between the damper piston and the side wall and/or between the damper rod and the passage wall. As identified in FIGS. 4-6, 12 and 15, friction-reducing bushings or wear bands 348 and 350 are respectively disposed between damper piston 310 and side wall 326 and between damper rod 310 and passage wall 336.

In some cases, it may be desirable to at least partially control or otherwise influence the relative positioning, movement and/or contact between damper elements 306 and 308. For example, the gas damper assembly can, in some cases, include one or more bumpers or cushions that can impede or otherwise substantially inhibit direct physical contact between damper piston 318 and another one or more components and/or elements of gas spring assembly 200 and/or gas damper assembly 300, such as one or more of end wall 328, base member 236 and/or one or more components and/or features of internal misalignment mount 500, 600 and/or 700, such as will be described in greater detail hereinafter. As one example, a bumper 352 is shown in FIGS. 4-7, 12 and 15 that includes a bumper body 354 at least partially formed from an elastomeric and/or polymeric material, such as a natural rubber, a synthetic rubber, a thermoplastic elastomer (e.g., polyurethane) and/or a comparatively rigid thermoplastic material (e.g., polyamide), for example. In some cases, bumper body 354 can include a mounting surface 356 dimensioned for securement on or along an associated component (e.g., damper piston 318) in a suitable manner, such as by way of one or more securement devices and/or a flowed-material joint (not shown), for example. Additionally bumper body 354 can include a distal surface 358 dimensioned to abuttingly engage one or more components and/or other elements of gas spring assembly 200, gas damper assembly 300 and/or internal misalignment mounts 500, 600 and/or 700.

Figure 4:
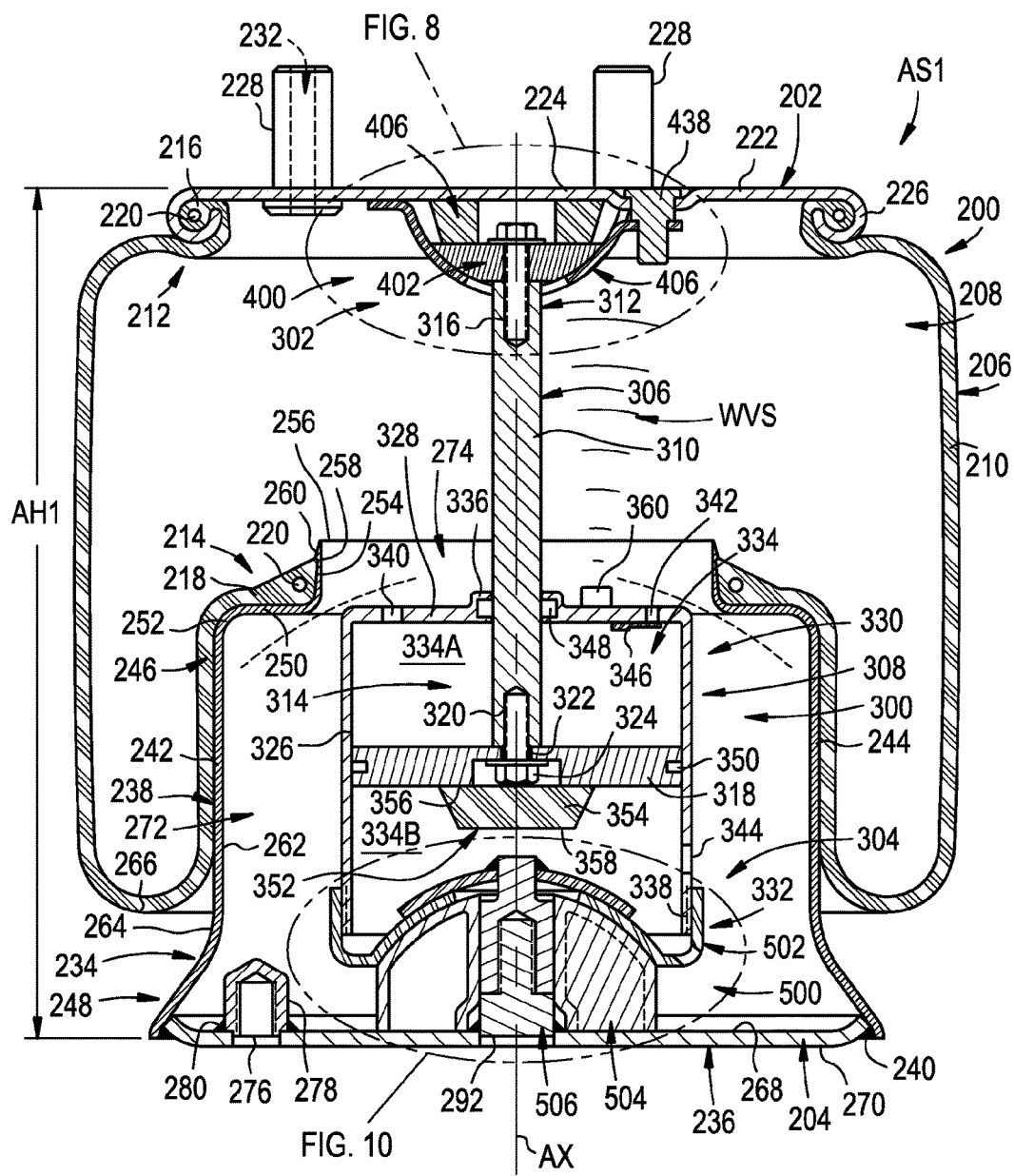
FIG. 4 is a cross-sectional side view of the assembly shown in FIGS. 2 and 3 taken from along line 4-4 in FIG. 3.

Assembly AS1 is shown in FIGS. 2-7 as being supported between upper and lower structural components USC and LSC and having an assembly height, which is represented in FIG. 4 by reference dimension AH1, that corresponds to an initial height condition of the assembly. In some cases, such an initial height condition may be referred to as a design height. At such a design height, rolling lobe 266 is disposed approximately at a design position along outer side wall portion 244 of end member 204. Additionally, damper piston 318 is disposed at a design position along side wall 326 within damping chamber 334.

Figure 5:
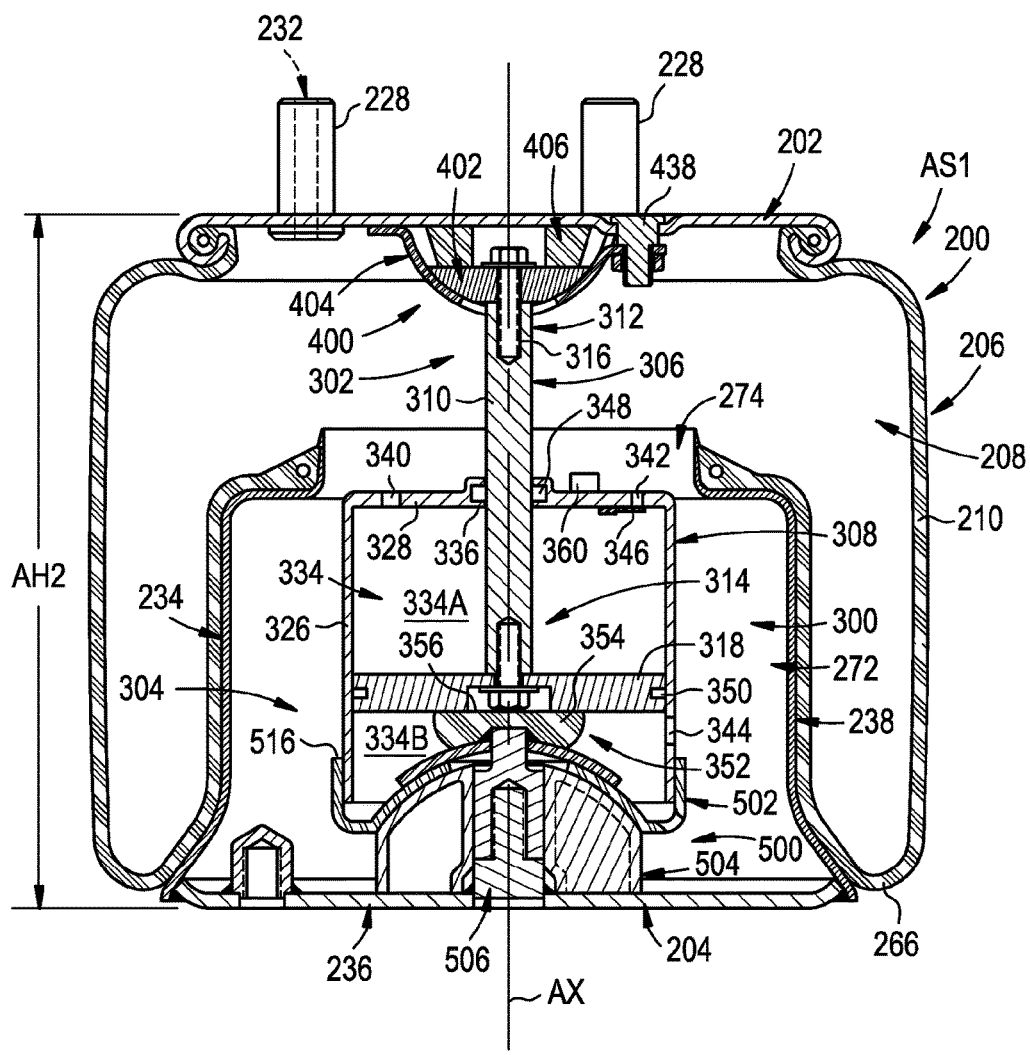
FIG. 5 is a cross-sectional side view of the assembly in FIGS. 2-4 shown in a compressed condition.

As assembly AS1 is displaced into a compressed condition, which may be referred to in the art as a jounce condition, end members 202 and 204 are moved toward one another and may reach a compressed height, which is represented in FIG. 5 by reference dimension AH2, that is less than design height AH1. As end members 202 and 204 are displaced toward one another, damper rod 310 and damper piston 318 of damper element 306 are also displaced toward base member 236 of end member 204. In some cases, distal surface 358 and/or another portion of bumper body 354 may contact or otherwise abuttingly engage one or more other components and/or elements of gas spring assembly 200, gas damper assembly 300 and/or internal misalignment mounts 500, 600 and/or 700, such as is illustrated in FIGS. 4-7, 12 and/or 15, for example.

It will be recognized that as assembly AS1 is compressed, the gas pressure within spring chamber 208 and chamber 272 increases, at least temporarily. It has been recognized that gas damping has a relationship to the magnitude of the difference between the pressure of the gas within the damping chamber (e.g., chamber portion 334B) and the pressure of the gas into which the gas from the damping chamber flows (e.g., chamber 272). Thus, increasing the pressure within the damping chamber (e.g., chamber portion 334B) and/or decreasing the pressure of the surrounding gas into which the gas from the damping chamber flows (e.g., chamber 272) can result in improved damping performance.

As described above, end wall 328 of damper element 308 includes ports 340 and 342 extending therethrough in fluid communication with chamber portion 334A of damping chamber 334. As damper piston 318 of damper element 306 is displaced toward base member 236 of end member 204, the volume of chamber portion 334A increases, which may initially result in a reduced pressure level within the chamber portion. As discussed above, however, the pressure level within spring chamber 208 and piston chamber 272 is increasing at this same time. As such, a portion of the pressurized gas within the spring and piston chambers will flow through ports 340 and 342 into chamber portion 334A, upon sizing and configuring ports 340 and/or 342 such that an appropriate total orifice area (e.g., total cross-sectional area for the active passages) for a given application is used. Additionally, one or more of ports 340 and/or 342 can be operatively associated with a one-way flow control device, such as valve 346, for example, that will permit pressurized gas transfer into chamber portion 334A while permitting an appropriate total orifice area to be used for damping purposed during displacement of the assembly in the opposing direction (i.e., during extension).

One benefit of permitting pressurized gas from the spring and piston chambers to flow into chamber portion 334A is that an overall reduction in the pressure within spring chamber 208 and chamber 272 can be achieved. And, as discussed above, improved damping performance can result from increasing the differential pressure between the gas within the damping chamber (e.g., chamber portion 334B) and the pressure of the gas into which the gas from the damping chamber flows (e.g., chamber 272). Another benefit of permitting pressurized gas from the chambers to flow into chamber portion 334A is that the gas pressure within chamber portion 334A is at least temporarily increased. As will be discussed in greater detail hereinafter, such an increased pressure level can provide a further increased pressure differential between the gas within chamber portion 334A and the gas into which the gas from chamber portion 334A will flow during extension.

Figure 6:
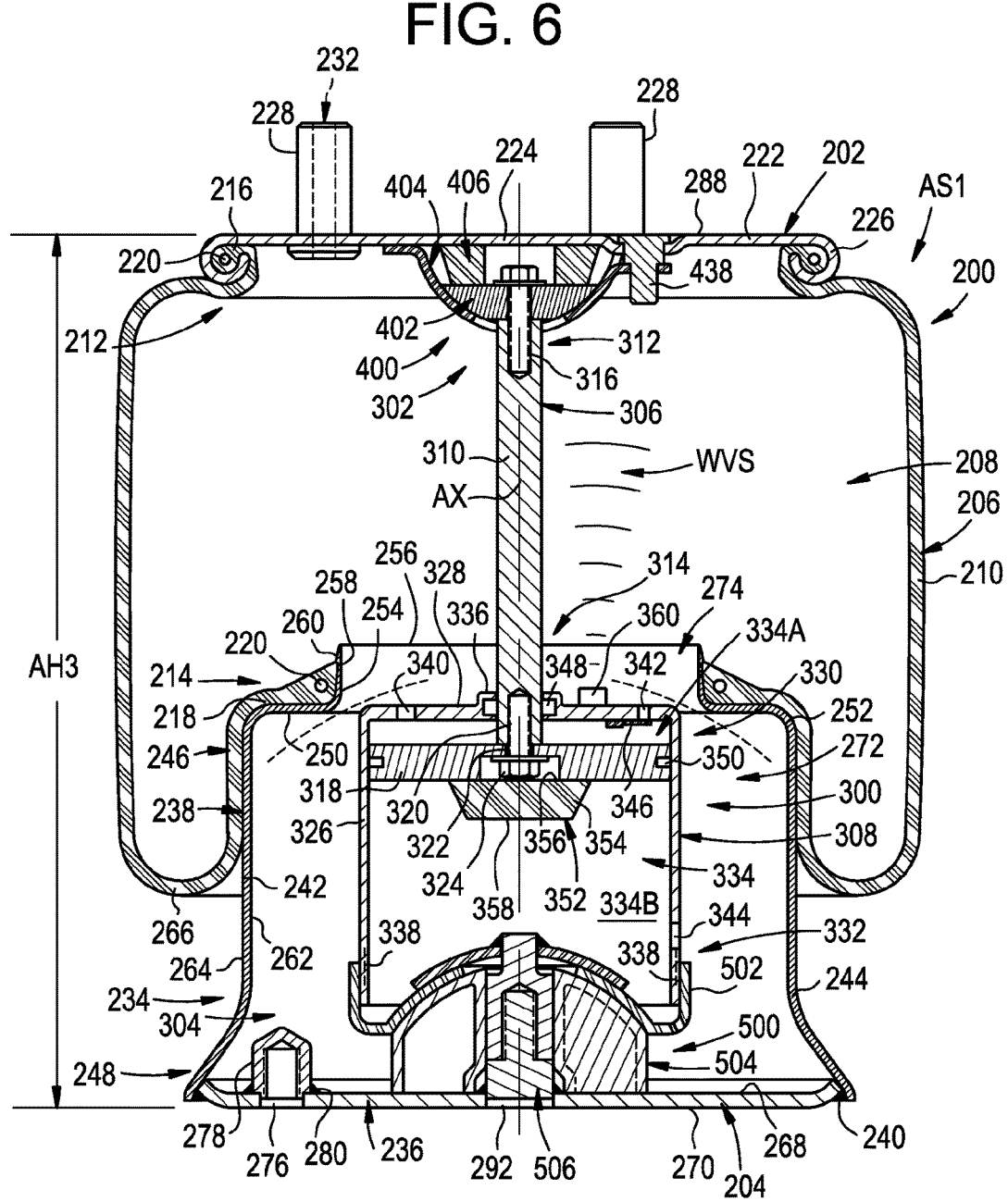
FIG. 6 is a cross-sectional side view of the assembly in FIGS. 2-5 shown in an extended condition.

As assembly AS1 is displaced into an extended condition, which may be referred to in the art as a rebound condition, end members 202 and 204 are moved away one another and may reach an extended height, which is represented in FIG. 6 by reference dimension AH3, that is greater than design height AH1. As end members 202 and 204 are displaced away from one another, damper rod 310 and damper piston 318 of damper element 306 are also displaced away from end member 204.

In which case, damper element 306 would compress the pressurized gas contained within chamber portion 334A and urge a portion of the pressurized gas to flow out of the chamber portion through ports 340 and 342 in end wall 328 and into chambers 208 and/or 272. It will be appreciated that valve 346 will cause ports 342 to remain fluidically isolated from chamber portion 334A, under such conditions pressurized gas is substantially inhibited from flowing out of the chamber portion through ports 342.

It will be appreciated that pressurized gas within chamber portion 334A is capable of flowing through the one or more ports at a given rate depending upon various factors, such as the total orifice area of ports 340 and/or 342, for example. As such, continued extension of assembly AS1 can compress the gas within chamber portion 334A and thereby increase the pressure level thereof.

Additionally, it will be recognized that as assembly AS1 is extended, the gas pressure within spring chamber 208 and chamber 272 decreases, at least temporarily. At that same time, the gas pressure within chamber portion 334A is increasing, such as has been described above, for example. As a result, an increased differential pressure between the gas within the damping chamber (e.g., chamber portion 334A) and the pressure of the gas into which the gas from the damping chamber flows (e.g., spring chamber 208 and/or chamber 272) may be achieved, which may provide increased damping performance. Additionally, as described above, valve 346 can, in some cases, act as a charging valve that permits an increased volume of pressurized gas to transfer into chamber portion 344A during compression, which can result in an increased overall pressure level within the chamber portion. Upon transitioning to extension, this increased overall pressure level represents the initial pressure level of the pressurized gas within chamber portion 344A as the chamber portion begins to decrease in volume, as described above.

An assembly in accordance with the subject matter of the present disclosure, such as assembly AS1, for example, can optionally include any number of one or more additional elements, features and/or components. For example, a distance sensing device can be operatively connected on or along one of the components of the gas spring assembly or the gas damper assembly. As shown in FIGS. 4, 6, 12 and 15, for example, a height sensor 360 can be operatively secured on or along end wall 328 of damper element 308 and can transmit suitable electromagnetic or ultrasonic waves WVS in an approximately longitudinal direction toward end member 202. It will be appreciated, however, that other arrangements could alternately be used.

It will be recognized that the foregoing discussion of FIGS. 4-6 regarding the displacement of assembly AS1 from a design height to a compressed height and an extended height refers to movement in a substantially longitudinal direction. In many applications, such as vehicle applications, for example, conventional gas spring assemblies are often displaced such that the first or upper end member (e.g., end member 202) and the second or lower end member (e.g., end member 204) are disposed at an axial offset and/or at an angle relative to one another. In some cases, the offset and/or angle may change (e.g., increase or decrease) as the end members are displaced toward and away from one another. It will be appreciated that conventional gas spring assemblies can typically accommodate such offset and/or angular misalignments. However, in cases in which an internally-mounted device, such as a gas damper assembly, hydraulic damper assembly, rebound limiter or spring aid, for example, is secured within the gas spring assembly, such an arrangement can limit or otherwise substantially reduce the amount of offset and/or angular misalignment that can be accommodated.

Figure 7:
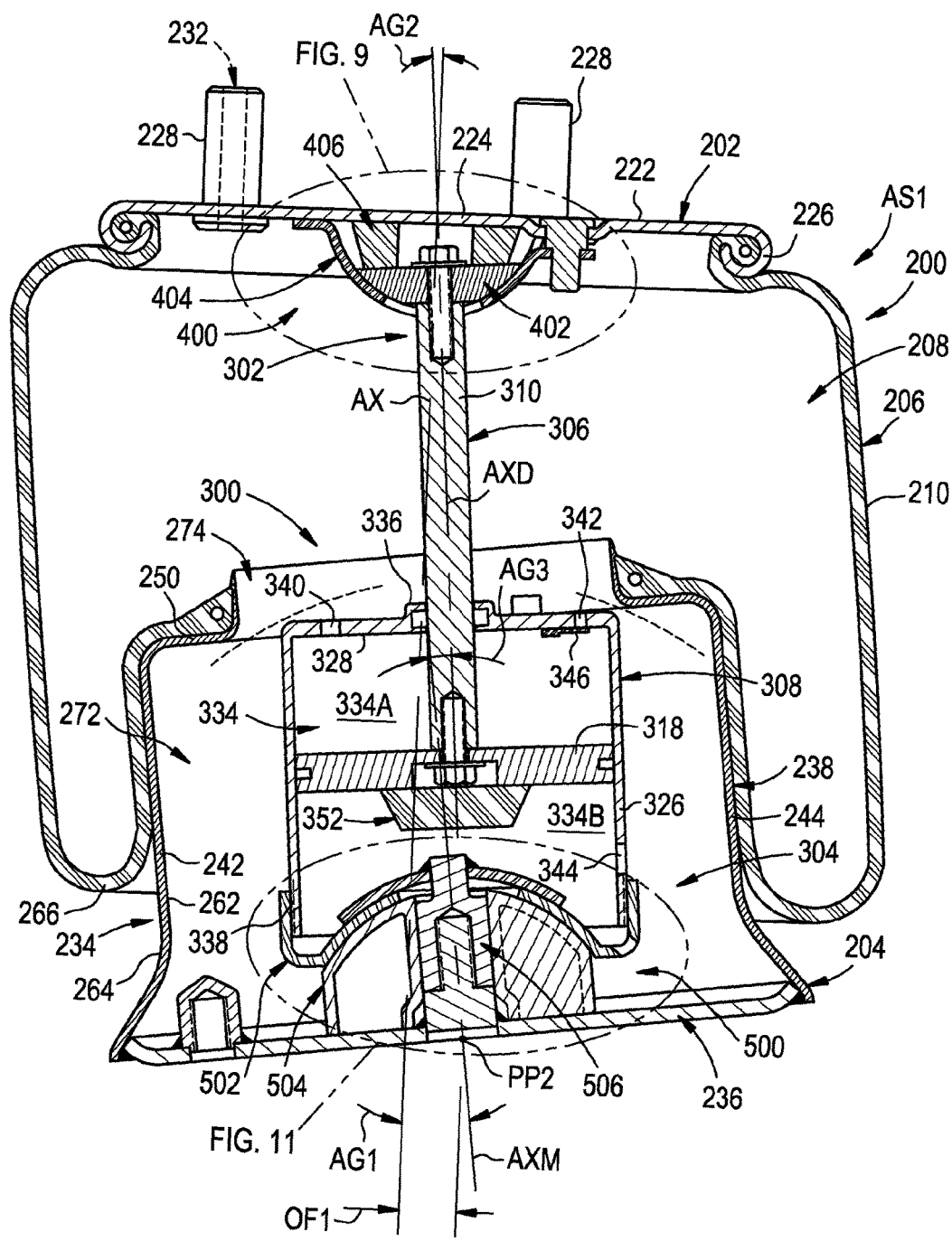
FIG. 7 is a cross-sectional side view of the assembly in FIGS. 2-6 shown in a misaligned condition.

With reference to FIG. 7, for example, assembly AS1 is illustrated with end member 202 disposed approximately transverse to longitudinal axis AX and with end member 204 disposed in offset relation to end member 202 and axis AX, as is represented by reference dimension OF1. Additionally, end member 204 shown as being rotated about a reference point RPT and, as such, disposed at an acute angle (e.g., more than zero (0) degrees and less than ninety (90) degrees) relative to end member 202 and/or axis AX, as is represented by angle reference dimension AG1 between axis AX and end member axis AXM. Under such conditions, the internally-mounted device (e.g., gas damper assembly 300) that is secured between the end members is disposed at one or more different angles relative to the end members and/or the longitudinal axis.

Figure 9:
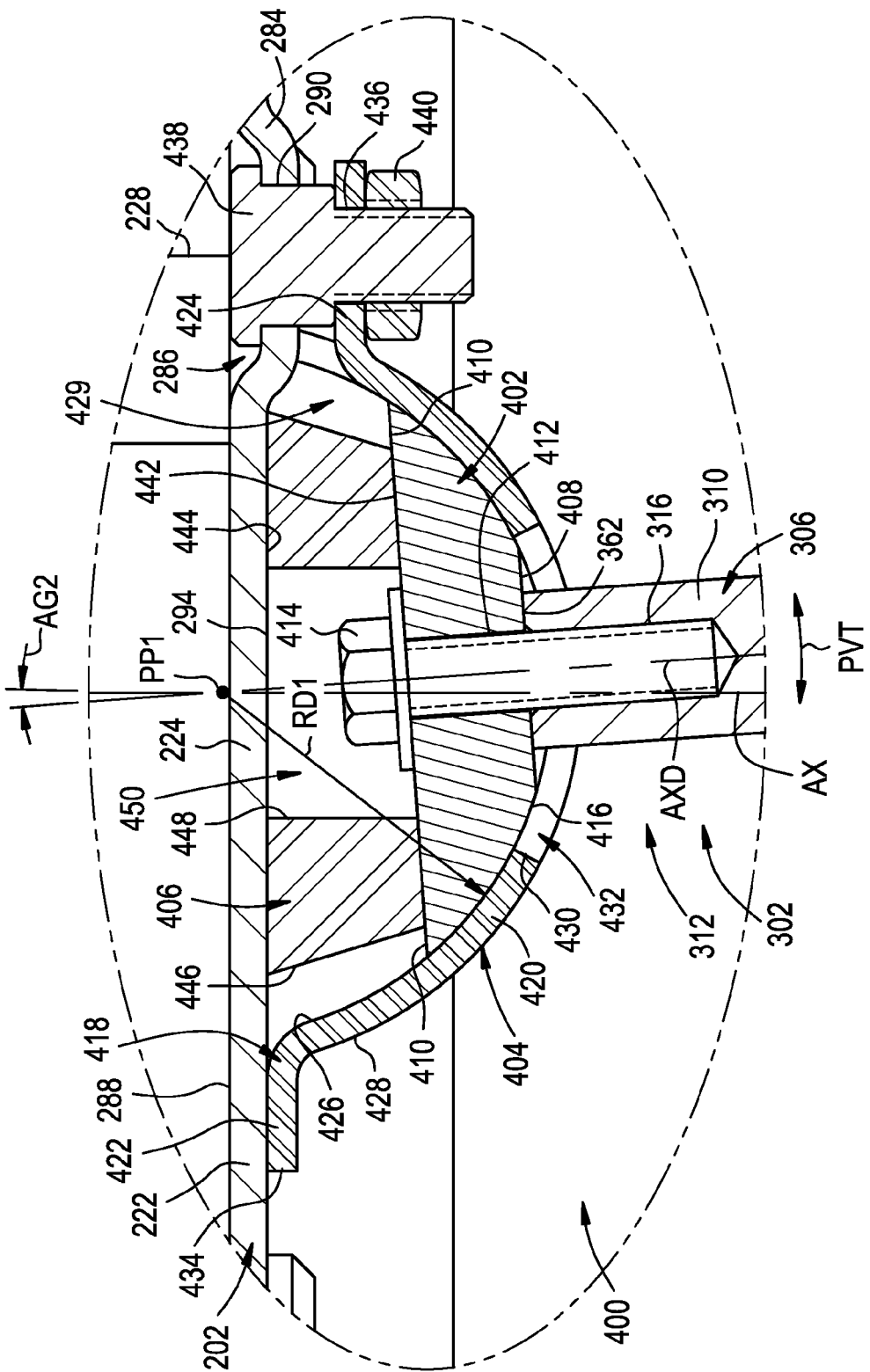
FIG. 9 is an enlarged, cross-sectional view of the portion of the assembly in FIG. 8 shown in a misaligned condition, as in FIG. 7.

In the arrangement shown in FIGS. 7 and 9, for example, gas damper assembly 300 extends from end member 202 in a generally longitudinal direction and is disposed at an acute angle relative to the end member, such as is represented in by angular reference dimension AG2 between longitudinal axis AX and internally-mounted device axis AXD, for example. Additionally, under some conditions of use, the internally-mounted device (e.g., gas damper assembly 300) can be disposed at an acute angle relative to the other end member and/or end member axis thereof. As shown in FIG. 7, gas damper assembly 300 is disposed at an acute angle relative to end member 204, such as is represented by angular reference dimension AG3 between internally-mounted device axis AXD and end member axis AXM, for example.

For an assembly in accordance with the subject matter of the present disclosure to be capable of broad use in a wide variety of applications, it is desirable for the assembly to be capable of operation in applications and operating conditions that can result in misalignment conditions between the components thereof without interfering with the operation, seal integrity and/or other performance characteristics of the internally-mounted device, such as have been described above, for example. As such, an assembly in accordance with the subject matter of the present disclosure can include one or more resilient internal misalignment mounts and/or one or more substantially non-resilient internal misalignment mounts that operatively connect the internally-mounted device to a corresponding one or more of the end members of the gas spring assembly.

One example of an internal misalignment mount in accordance with the subject matter of the present disclosure, which may also be referred to herein as a mounting assembly, is illustrated in FIGS. 2-9, 12 and 15 as mounting assembly 400 that is shown operatively connecting end member 202 of gas spring assembly 200 and damper element 306 of gas damper assembly 300. Mounting assembly 400 can include a device mount (or mounting plate) 402 that is secured on or along damper element 306. Mounting assembly 400 can also include a retainer 404 that at least partially receives mounting plate 402 and is secured on or along end member 202. Additionally, one or more supports 406 can be disposed between end member 202 and a mounting plate 402, and can maintain the mounting plate in spaced relation to the end member. In some cases, supports 406 can take the form of or otherwise include one or more biasing elements, and may be referred to as such hereinafter. In such case, the one or more biasing elements can urge the mounting plate in a direction away from end member 202 and into abutting engagement with retainer 404.

Figure 8:
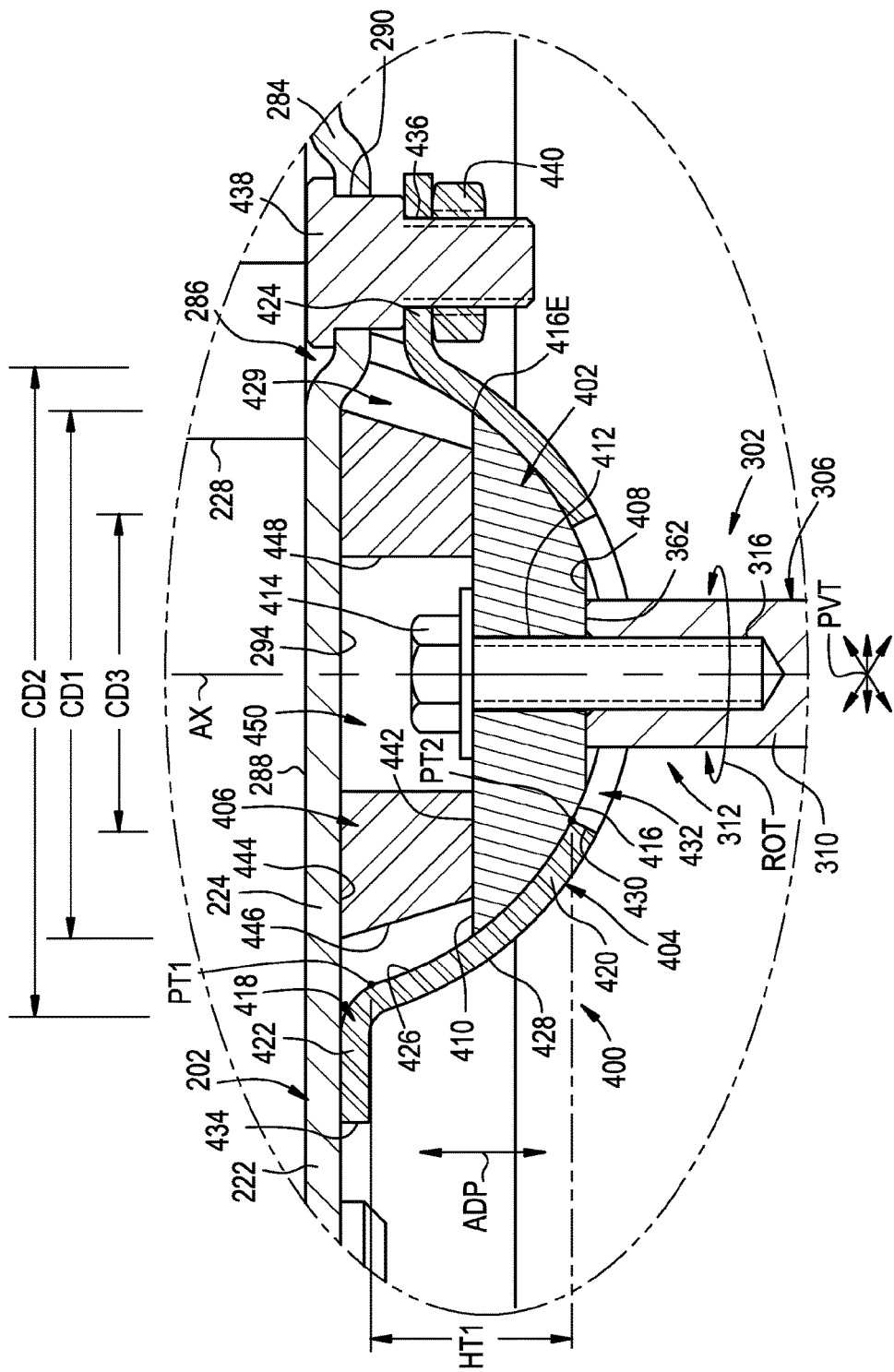
FIG. 8 is an enlarged, cross-sectional view of the portion of the assembly in FIGS. 2-7 identified as Detail 8 in FIG. 4.

Mounting plate 402 is shown as including a surface 408 disposed toward damper element 306 and a surface 410 that is opposite surface 408 and disposed toward end member 202. A hole or passage 412 can extend through mounting plate 402 and can be accessible from along surfaces 408 and 410. In a preferred arrangement, hole 412 can be disposed in approximate alignment with threaded passage 316 of damper rod 310 such that a securement device, such as a threaded fastener 414, for example, can extend through the hole and operatively connect mounting plate 402 to damper element 306. In some cases, a recess or other engagement feature (not shown) can be provided on or along surface 408 of mounting plate 402 that is dimensioned to receive or otherwise engage at least a portion of the damper rod of damper element 306. In other cases, surface 408 can be approximately planar and can abuttingly engage an end surface 362 of damper rod 310, such as is shown in FIGS. 8 and 9, for example. Additionally, in some cases, surface 410 can include a recess or other engagement feature (not shown) that is dimensioned to receive or otherwise engage at least a portion of one or more of biasing elements 406. In other cases, however, surface 410 can be approximately planar and can abuttingly engage the one or more biasing elements.

Mounting plate 402 also includes a surface 416 that is disposed or otherwise extends at least partially between surfaces 408 and 410. Surface 416 is shown as being generally convex and, in a preferred arrangement, can have a curved cross-sectional profile that can, in some cases, form an approximately semi-spherical shape with a center or pivot point PP1 (FIG. 9). Additionally, mounting plate 402 can have an outer peripheral edge 416E (FIG. 8) that can, in some cases, at least partially define a cross-sectional dimension of surface 416, such as is represented in FIG. 8 by reference dimension CD1.

It will be appreciated that mounting plate 402 can be formed from any material or combination of materials suitable for use in operatively connecting the internally-mounted device on or along an end member of the gas spring assembly, such as one or more metal materials and/or one or more polymeric materials, for example. In a preferred arrangement, mounting plate 402 can be formed from a polymeric material having a relatively low coefficient of friction such that the mounting plate can slide or can be otherwise displaced relative to retainer 404. Non-limiting examples of such a polymeric material can include polyamide compounds, polyethylene compounds, polytetrafluoroethylene compounds and/or polyoxymethylene compounds.

Retainer 404 includes a retainer wall 418 that can be formed from any material or combination of materials suitable for use in operatively connecting the internally-mounted device on or along an end member of the gas spring assembly, such as one or more metal materials and/or one or more polymeric materials, for example. In a preferred arrangement, retainer wall 418 can be formed from a metal material having a thin cross-section such that the mounting assembly can have a minimal or at least reduced overall height, which can, in some cases, allow for increased travel of the internally-mounted device.

Retainer wall 418 includes one or more wall portions 420 dimensioned to receive at least a portion of mounting plate 402 and can, optionally, include one or more wall portions 422 dimensioned to operatively engage end member 202 and/or one or more wall portions 424 adapted for use in securing retainer 404 on or along end member 202. Wall portions 420 are shown as including an inner surface 426, an outer surface 428 and an inner edge 430 that at least partially defines a hole or opening 432 through the retainer. Damper rod 310 and/or mounting plate 402 can be operatively connected with one another through opening 432, and the opening can be dimensioned to accommodate a full range of displacement (e.g., omnidirectional, 360 degree pivotal, rotational and/or axial movement) of the internally-mounted device (e.g., gas damper assembly 300).

Inner surface 426 is shown as being concave and outer surface 428 is shown as being convex with inner surface 426 at least partially defining a recess or cavity 429 within which mounting plate 402 can be at least partially received. In some cases, at least a portion of inner surface 426 can have a curved cross-section profile extending between reference points PT1 and PT2 (FIG. 8) that can, in some cases, form an approximately semi-spherical surface segment or shape that is dimensioned to receive and cooperatively engage surface 416 of mounting plate 402. Additionally, in some cases, a circumferential reference line (e.g., a parallel of latitude) can extend through point PT1 and have a cross-sectional dimension, such as is represented in FIG. 8 by reference dimension CD2. Furthermore, in some case, a circumferential reference line (e.g., a parallel of latitude) can extend through point PT2 and have a cross-sectional dimension, such as is represented in FIG. 8 by reference dimension CD3.

In the arrangement shown in FIGS. 4-9, 12 and 15, the circumferential reference lines extending through points PT1 and PT2 are oriented transverse to longitudinal axis AX. Additionally, the circumferential reference line extending through point PT1 has a greater cross-sectional dimension than the circumferential reference line extending through point PT2. As such, reference dimension CD2 is shown as being greater than reference dimension CD3.

The portion of inner surface 426 having an approximately semi-spherical segment shape can have a segment height HT1 (FIG. 8) extending in a direction approximately aligned with longitudinal axis AX. The segment height can extend between point PT1 that corresponds to cross-sectional dimension CD2 and point PT2 that corresponds to cross-sectional dimension CD3. In a preferred arrangement, segment height HT1 is less than a radial dimension of the semi-spherical surface segment of inner surface 426, as is represented in FIG. 9 by radius RD1 extending from point PP1 to inner surface 426.

In some cases, the surface can be oriented such that the point through which the lesser cross-sectional dimension extends can be disposed toward the end member and the point through which the greater cross-sectional dimension extends can be disposed away from the end member. In other cases, such as is shown and described in connection with mounting assembly 400, for example, the point through which the greater cross-sectional dimension extends can be disposed toward the end member and the point through which the lesser cross-sectional dimension extends can be disposed away from the end member. Additionally, in a preferred arrangement, cross-sectional dimension CD1 of surface 416 can be less than cross-sectional dimension CD2 but greater than cross-sectional dimension CD3. In this manner, mounting plate 402 can be received within cavity 429 and axially displaced relative to retainer 404.

Wall portions 422, if included, can at least partially define an outer edge 434 of the retainer, and can be dimensioned to abuttingly engage end member 202, such as on or along inner surface 294 of the end member, for example. In some cases, wall portions 422 could be secured or otherwise attached directly to the end member, such as by way of a flowed-material joint (not shown), for example. In other cases, wall portions 424 can be included and can be adapted for use in securing the retainer on or along the associated end member. As one example, wall portions 424 can include holes or openings 436 extending therethrough that are dimensioned to receive a corresponding securement device, such as a threaded fastener 438, for example. In some cases, holes 436 can include one or more helical threads (not shown) dimensioned to cooperatively engage the threaded fastener. In other cases, a cooperative securement device, such as a threaded nut 440, for example, can be used.

It will be appreciated that the one or more biasing elements can be operatively connected between mounting plate 402 and end member 202 in any suitable manner. In such cases, the mounting assembly may function as a resilient internal misalignment mount. As one example, biasing element 406 is shown as including a surface 442 disposed in abutting engagement with surface 410 of mounting plate 402 and a surface 444 disposed in abutting engagement with surface 294 of end member 202. Biasing element 406 is also shown as including an outer surface 446 and can, in some cases, include an inner surface 448 that at least partially defines a hole or opening 450 extending through the biasing element.

In cases in which one or more supports 406 act as or otherwise include one or more biasing elements, it will be appreciated that the one or more biasing elements (e.g., biasing element 406) can be formed from any material or combination of materials that may be suitable for biasing mounting plate 402 in a direction toward retainer 404 and suitable for resilient displacement in a direction toward end member 202. Additionally, it will be appreciated that the one or more biasing elements can be of any suitable type, kind and/or construction, and that any quantity, configuration and/or arrangement of biasing elements can be used. As one non-limiting example, one or more metal springs could be used, such as one or more coil springs and/or one or more frustoconical disc springs, for example. As another non-limiting example, one or more spring elements that are at least partially formed from an elastomeric polymer material could be used, such as one or more spring elements that include a quantity of natural rubber, synthetic rubber and/or thermoplastic elastomer (e.g., polyurethane), for example.

As indicated above, the one or more biasing elements (e.g. biasing element 406) can act to bias or otherwise urge mounting plate 402 in a direction toward retainer 404 and can also permit resilient displacement in the opposing direction (e.g., a direction toward end member 202). In this manner, mounting assembly 400 is capable of permitting relative displacement in a generally axial direction between an end member (e.g., end member 202) and a component of the internally-mounted device (e.g., damper element 306), as is represented in FIG. 8 by arrow ADP. Additionally, mounting assembly 400 is capable of permitting a component of the internally-mounted device (e.g., damper element 306) to pivot, swivel, tilt or otherwise undergo displacement through 360 degrees about and/or around corresponding center or pivot point PP1 (FIG. 9) and relative to an end member (e.g., end member 202) of the gas spring assembly, as is represented in FIG. 8 by arrow PVT. Furthermore, mounting assembly 400 can, in some cases, be capable of permitting a component of the internally-mounted device (e.g. damper element 306) to rotate about longitudinal axis AX relative to an end member (e.g., end member 202) of the gas spring assembly, as is represented in FIG. 8 arrow ROT.

Also, due, at least in part, to the influence of the one or more biasing elements (e.g., biasing element 406), the internally-mounted device and/or components thereof can be biased or otherwise urged from a displaced condition (FIGS. 7 and 9) toward an aligned or neutral condition, such as is shown in FIGS. 4 and 8, for example.

Another example of an internal misalignment mount in accordance with the subject matter of the present disclosure, which may also be referred to herein as a mounting assembly, is identified in FIGS. 4-7, 10 and 11 as mounting assembly 500, which is shown operatively connecting end member 204 of gas spring assembly 200 and damper element 308 of gas damper 300. Mounting assembly 500 is shown and described herein as including a device mount 502, a support 504 and a retainer 506 that secures device mount 502 and/or support 504 on or along end member 204 of the gas spring assembly. As such, device mount 502 is characterized herein as forming a part of mounting assembly 500 and as being operatively attached to damper element 308 to assist in securing the damper element on or along end member 204. It will be appreciated, however, that, in the alternative, device mount 502 could be characterized as being a component of gas damper assembly 300 without departing from the subject matter of the present disclosure. As such, the subject matter of the present disclosure is not intended to be limited to the groupings of components shown and described herein, which are merely exemplary.

Figure 10:
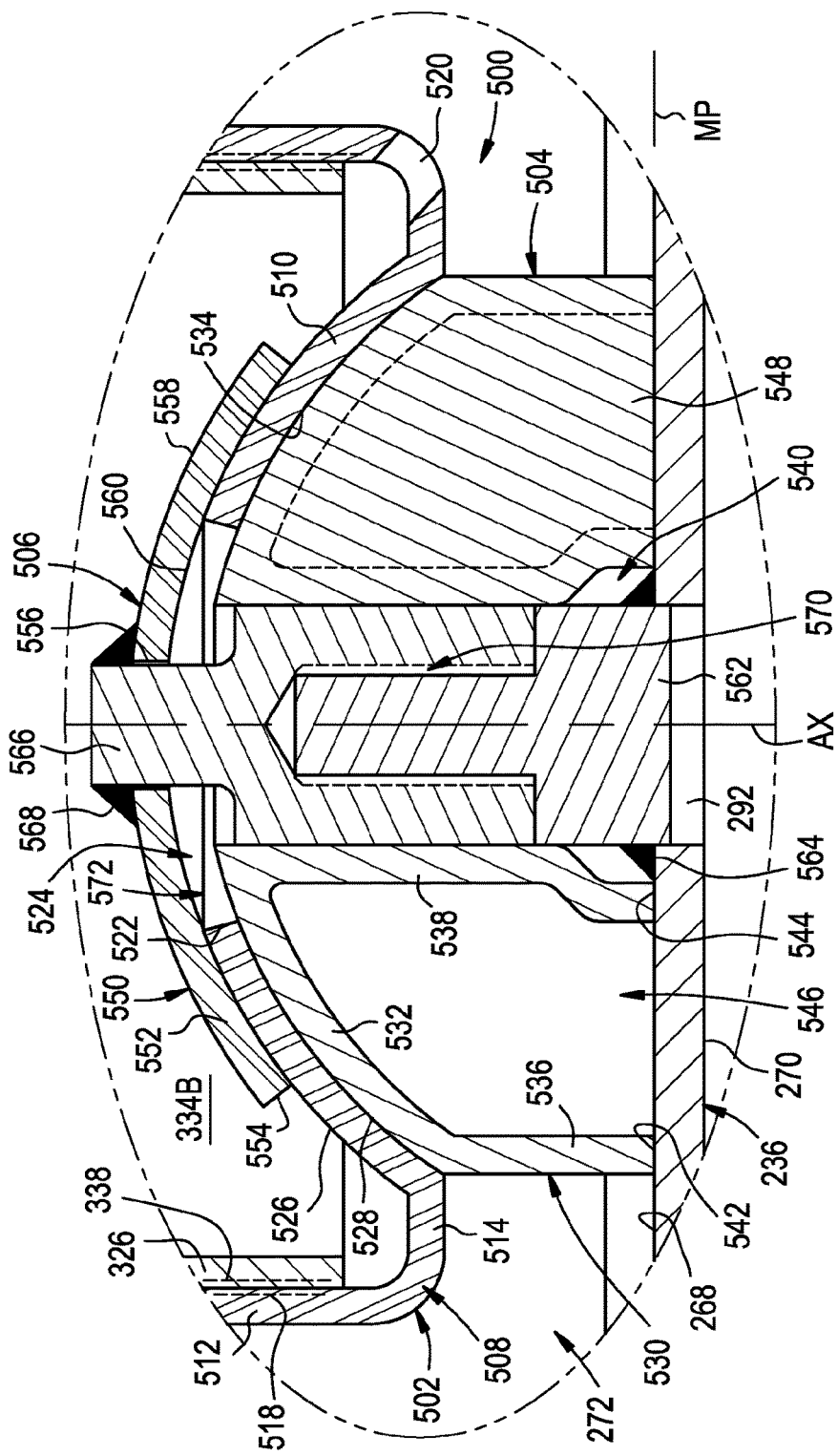
FIG. 10 is an enlarged, cross-sectional view of the portion of the assembly in FIGS. 2-7 identified as Detail 10 in FIG. 4.
Figure 11:
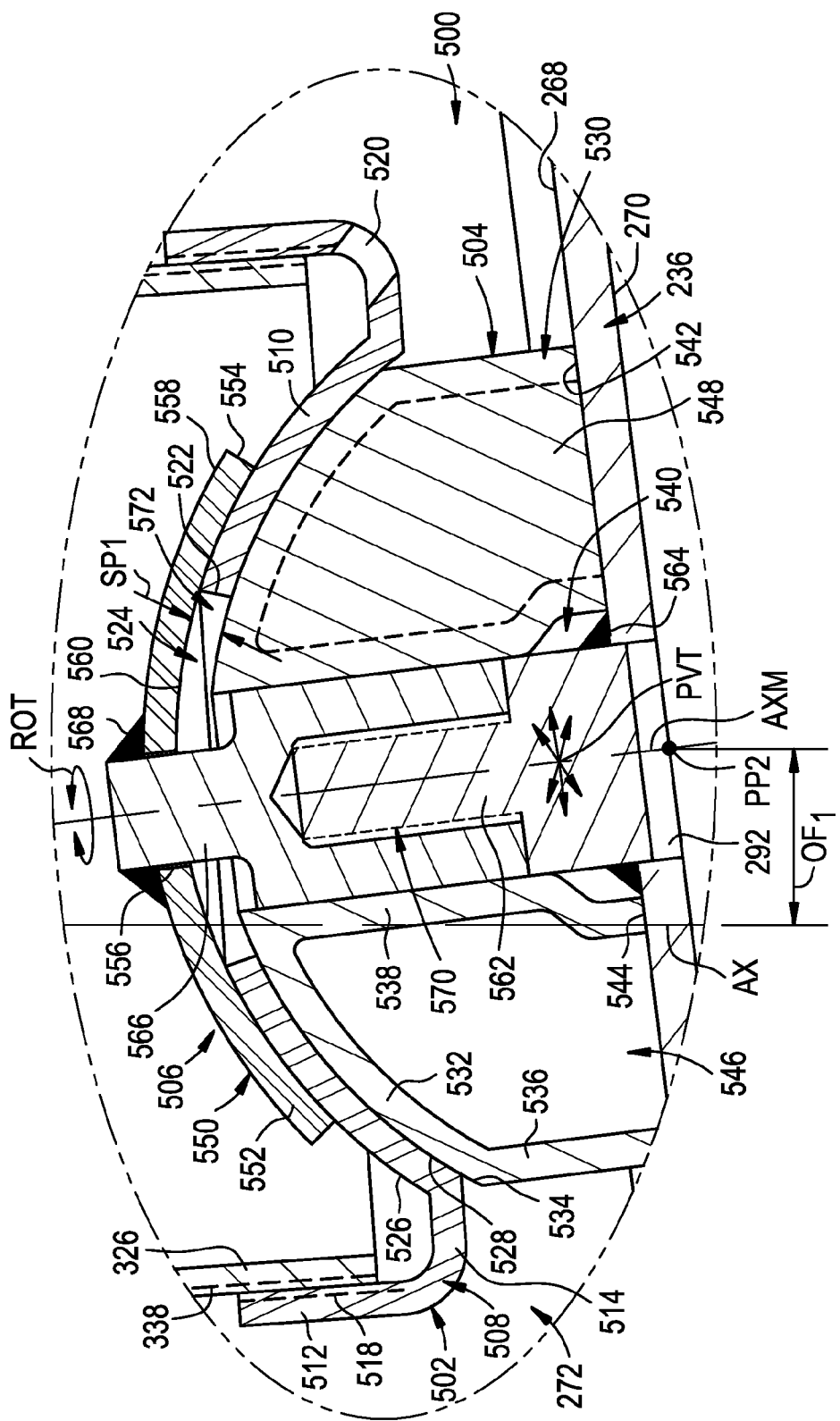
FIG. 11 is an enlarged, cross-sectional view of the portion of the assembly in FIG. 10 shown in a misaligned condition, as in FIG. 7.

As identified in FIGS. 10 and 11, device mount 502 can include a wall 508 that includes a central wall portion 510 disposed transverse to axis AX and a side wall portion 512 that extends in a generally axial direction. In some cases, an end wall portion 514 can be disposed radially-outward from central wall portion 510 and can operatively interconnect the central wall portion and side wall portion 512. Side wall portion 510 can terminate at a distal edge 516 (FIG. 5) and can be dimensioned to cooperatively engage at least a portion of side wall 326 of damper element 308. Additionally, device mount 502 can be secured on or along side wall 326 in any suitable manner. As one example, the device mount can be attached to the side wall by way of a flowed-material joint (not shown). As another example, device mount 502 can include one or more helical threads 518 disposed on or along side wall portion 512 that are complementary to helical threads 338 such that a threaded connection (not numbered) can be formed between the device mount and the side wall of the damper element. It will be appreciated, however, that other configurations and/or constructions could alternately be used.

Wall 508 of device mount 502 can be formed from any material or combination of materials suitable for use in operatively connecting the internally-mounted device on or along an end member of the gas spring assembly, such as one or more metal materials and/or one or more polymeric materials, for example. In a preferred arrangement, wall 508 can be formed from a metal material having a thin cross-section such that the mounting assembly can have a minimal or at least reduced overall height, which can, in some cases, allow for increased travel of the internally-mounted device and/or the overall assembly.

As indicated above, side wall 326 can include a passage or port 344 extending therethrough such that damping chamber portion 334B can be in fluid communication with spring chamber 208 and/or chamber 272. Additionally, or in the alternative, wall 508 can, optionally, include a passage or port 520 extending therethrough that can permit fluid communication between damping chamber portion 334B and spring chamber 208 and/or chamber 272.

Central wall portion 510 extends radially-inward to an inner edge 522 that at least partially defines a hole or opening 524 through device mount 502. In a preferred arrangement, device mount 502 can be operatively connected on or along end member 204 through opening 524, and the opening can be dimensioned to accommodate a full range of displacement (e.g., omnidirectional, 360 degree pivotal, rotational and/or axial movement) of the internally-mounted device (e.g., gas damper assembly 300).

Central wall portion 510 also includes opposing surfaces 526 and 528 with surface 526 being convex and facing toward damping chamber 334 and with surface 528 being concave and facing away from damping chamber 334. In the arrangement shown in FIGS. 4-7, 10 and 11, surface 528 at least partially defines a recess or cavity (not numbered) formed into device mount 502 and opening outwardly such that the cavity is facing end member 204. In a preferred arrangement, surface 528 and the cavity that is at least partially formed thereby can be dimensioned to receive at least a portion of support 504, which supports device mount 502 in spaced relation to base member 236 of end member 204 of gas spring assembly 200.

Support 504 can include a wall 530 that can include an end wall portion 532 that has an outer surface 534, which is shown as being convex and disposed in facing relation to surface 528 of central wall portion 510. Wall 530 can also, optionally, include one or more side wall portions, such as an outer side wall portion 536 and/or an inner side wall portion 538. In some cases, outer side wall portion 536 can at least partially define an outer periphery of the support. Inner side wall portion 538 can at least partially define an inner passage or opening 540 extending through support 504. If included, outer side wall 536 can extend axially from along end wall portion 532 to a distal edge 542. Additionally, or in the alternative, inner side wall 538 can extend axially from along end wall portion 532 toward a distal edge 544. As such, either or both of distal edges 542 and 544 can at least partially define a mounting plane MP (FIG. 10) of support 504 and can, in some cases, be disposed in abutting engagement with surface 268 of base member 236. One or more wall portions of wall 530 can at least partially define a cavity 546 extending into support 504 from along distal edges 542 and 544. In some cases, one or more connecting wall portions 548 can extend between and operatively interconnect inner and outer side wall portions 536 and 538. It will be appreciated, however, that other configurations and/or arrangements could alternately be used.

Retainer 506 can include any suitable combination of components and/or features for operatively connecting device mount 502 and support 504 on or along an end member (e.g., end member 204) of gas spring assembly 200. As one example, retainer 506 can include a retaining plate 550 that includes a plate wall 552 having an outer peripheral edge 554 and an inner edge 556 that at least partially defines a hole or opening (not numbered) extending through the plate wall. Additionally, plate wall 552 can include a surface 558 that is shown as being convex, and can optionally include a surface 560 that is shown as being concave and is disposed in facing relation to surface 526 of central wall portion 510.

The retaining plate can be operatively connected to the end member in any suitable manner. For example, a mounting stud 562 can be secured on or along base member 236 in a suitable manner. In some cases, mounting stud 562 can be dimensioned to be at least partially received within opening 292 in base member 236 and can be secured to the base member by way of a flowed-material joint 564. In such cases, retaining plate 550 can be attached to mounting stud 562 in any suitable manner. For example, a connector fitting 566 can be secured to plate wall 552, such as by way of a threaded connection or by way of a flowed-material joint 568, for example. Additionally, connector fitting 566 can be operatively connected to mounting stud 562 in any suitable manner, such as by way of a threaded connection 570, for example.

In a preferred arrangement, mounting assembly 500 is capable of permitting a component of the internally-mounted device (e.g., damper element 308) to pivot, swivel, tilt or otherwise undergo displacement through 360 degrees about and/or around corresponding center or pivot point PP2 (FIG. 11) and relative to an end member (e.g., end member 204) of the gas spring assembly, as is represented in FIG. 11 by arrow PVT. In some cases, such movement may be substantially non-resilient. Furthermore, mounting assembly 500 can, in some cases, be capable of permitting a component of the internally-mounted device (e.g. damper element 308) to rotate about end member axis AXM relative to the end member (e.g., end member 204) of the gas spring assembly, as is represented in FIG. 11 arrow ROT.

In a preferred arrangement, at least surfaces 526 and 528 of end wall portion 510, surface 534 of end wall portion 532 and surface 560 of plate wall 552 can have a curved cross-sectional profile extending between reference points, such as have been described above as reference points PT1 and PT2, for example that can, in some cases, form an approximately semi-spherical surface segment or shape. In such cases, surfaces 534 and 560 can be spaced apart from one another, as is represented in FIG. 11 by reference dimension SP1. As such, a semi-spherical cavity 572 can be formed between surfaces 534 and 560 and can be dimensioned to receive at least a section of end wall portion 510. It will be appreciated that the discussion of circumferential reference lines, reference dimensions, segment height and corresponding radial dimension provided above in connection with mounting assembly 400 may be equally applicable to mounting assembly 500.

Additionally, as shown in FIGS. 4-7, 10 and 11, one or more of surfaces 526, 528, 534 and/or 560 can be oriented such that a point through which a lesser cross-sectional dimension extends can be disposed away from the associated end member and a point through which a greater cross-sectional dimension extends can be disposed toward the associated end member. In other cases, a point through which a greater cross-sectional dimension extends can be disposed away from the associated end member and a point through which a lesser cross-sectional dimension extends can be disposed toward the associated end member.

Figure 12:
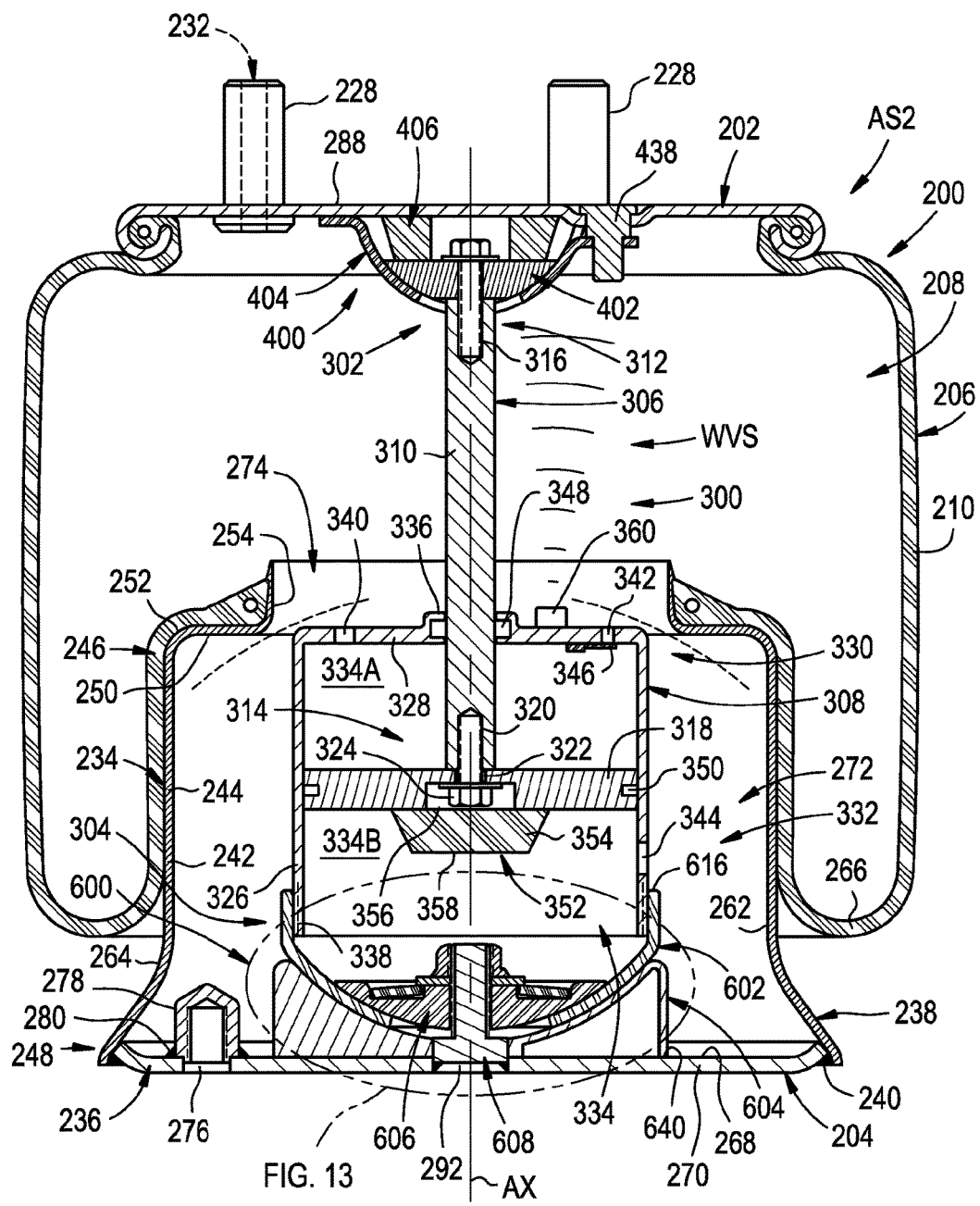
FIG. 12 is a cross-sectional side view of another example of an assembly including an internal misalignment mount in accordance with the subject matter of the present disclosure.
Figure 13:
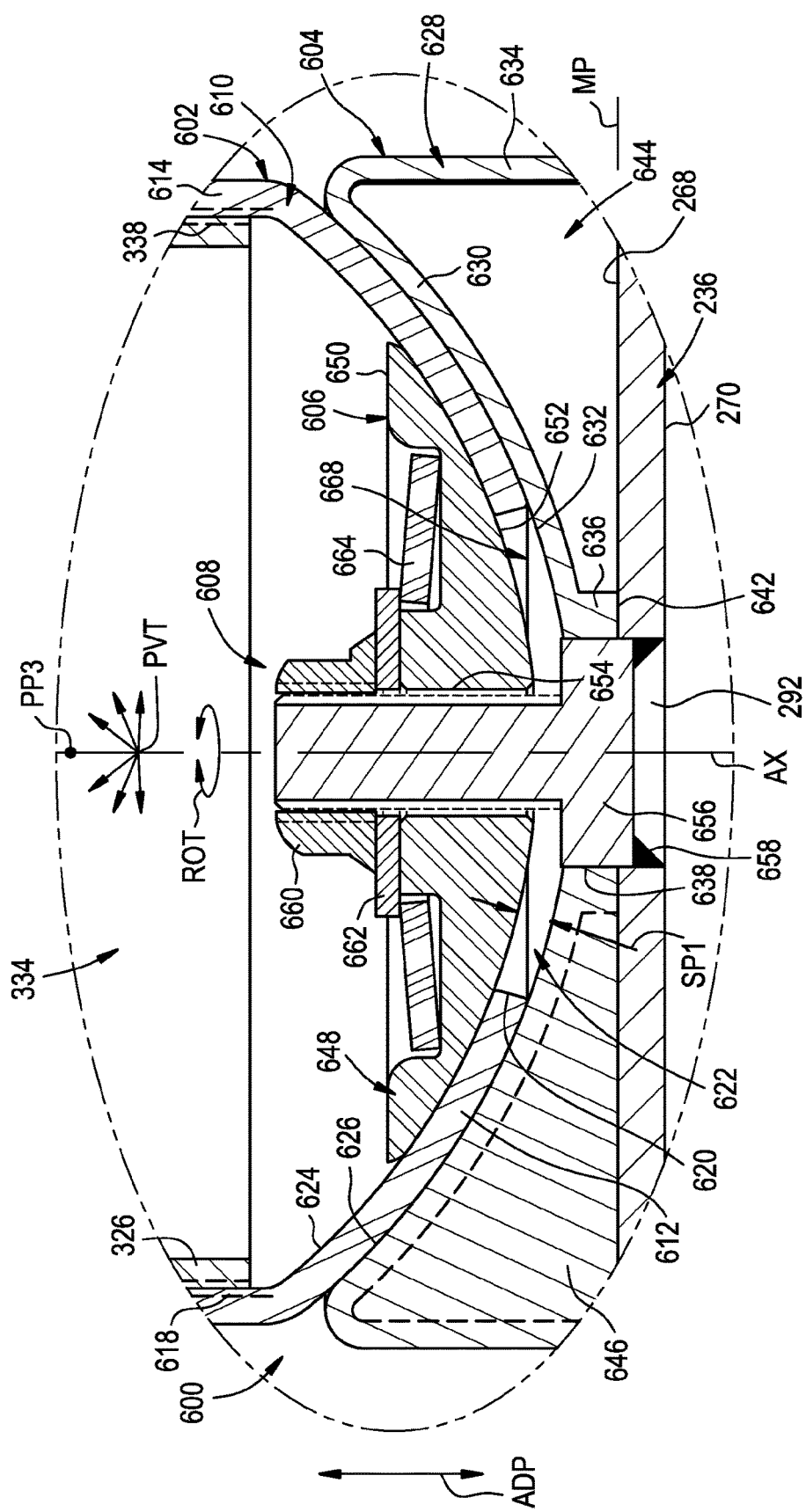
FIG. 13 is an enlarged, cross-sectional view of the portion of the assembly in FIG. 12 identified as Detail 13 therein.
Figure 14:
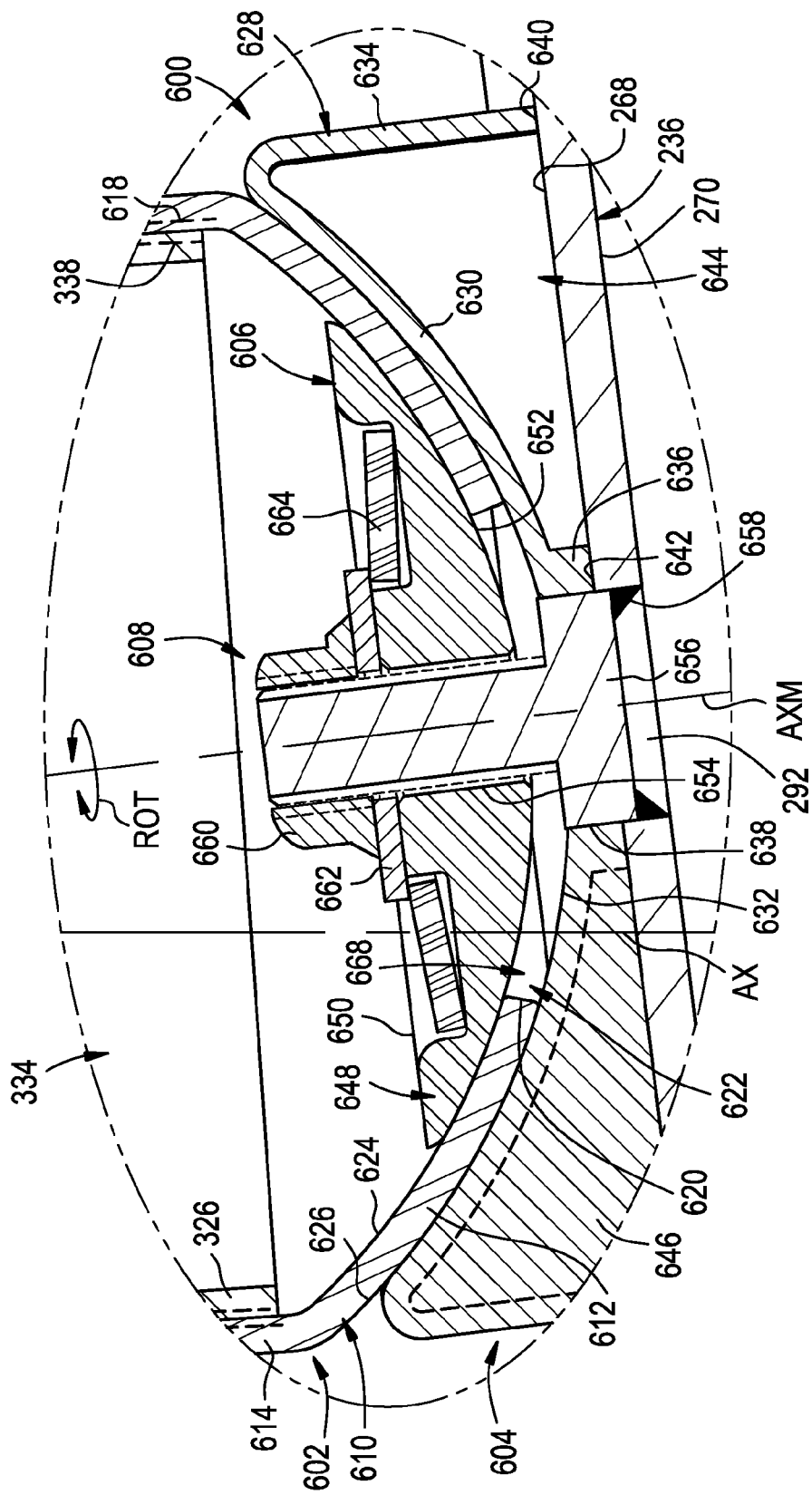
FIG. 14 is an enlarged, cross-sectional view of the portion of the assembly in FIG. 13 shown in a misaligned condition.

Another example of an assembly AS2 in accordance with the subject matter of the present disclosure, such as may be suitable for use as assemblies 110 in FIG. 1, for example, is shown in FIGS. 12-14. Assembly AS2 includes gas spring assembly 200, gas damper assembly 300 and mounting assembly 400, such as have been describe in detail above, as well as another example of an internal misalignment mount in accordance with the subject matter of the present disclosure. The internal misalignment mount is identified in FIGS. 12-14 as mounting assembly 600 and is shown operatively connecting end member 204 of gas spring assembly 200 and damper element 308 of gas damper 300.

Mounting assembly 600 is shown and described herein as including a device mount 602, a support 604, a retainer 606 (which may alternately be referred to herein as a bearing plate) and a securement assembly 608 that secures device mount 602, support 604 and retainer 606 on or along end member 204 of the gas spring assembly. It will be appreciated, however, that, in the alternative, device mount 602 could be characterized as being a component of gas damper assembly 300 without departing from the subject matter of the present disclosure. As such, the subject matter of the present disclosure is not intended to be limited to the groupings of components shown and described herein, which are merely exemplary.

As identified in FIGS. 13 and 14, device mount 602 can include a wall 610 that includes a central wall portion 612 oriented or otherwise disposed generally transverse to axis AX and a side wall portion 614 that extends in a generally axial direction. Side wall portion 614 can terminate at a distal edge 616 (FIGS. 5 and 12) and can be dimensioned to cooperatively engage at least a portion of side wall 326 of damper element 308. Additionally, device mount 602 can be secured on or along side wall 326 in any suitable manner. As one example, the device mount can be attached to the side wall by way of a flowed-material joint (not shown). As another example, device mount 602 can include one or more helical threads 618 disposed on or along side wall portion 614 that are complementary to helical threads 338 such that a threaded connection (not numbered) can be formed between the device mount and the side wall. It will be appreciated, however, that other configurations and/or constructions could alternately be used.

Central wall portion 612 extends radially inward to an inner edge 620 that at least partially defines a hole or opening 622 through device mount 602. In a preferred arrangement, device mount 602 can be operatively connected on or along end member 204 through opening 622, and the opening can be dimensioned to accommodate a full range of displacement (e.g., omnidirectional, 360 degree pivotal, rotational and/or axial movement) of the internally-mounted device (e.g., gas damper assembly 300). Central wall portion 612 also includes opposing surfaces 624 and 626 with surface 624 being concave and facing toward damping chamber 334 and with surface 626 being convex and facing away from damping chamber 334.

Support 604 can include a wall 628 that can include an end wall portion 630 that has a surface 632, which is shown as being concave and disposed in facing relation to surface 626 of central wall portion 612. Wall 628 can also, optionally, include one or more side wall portions, such as an outer side wall portion 634 and/or an inner side wall portion 636. In some cases, outer side wall portion 634 can at least partially define an outer periphery of the support. Inner side wall portion 636 can at least partially define an inner passage or opening 638 extending through support 604. If included, outer side wall 634 can extend axially from along end wall portion 630 to a distal edge 640 (FIG. 12). Additionally, or in the alternative, inner side wall 636 can extend axially from along end wall portion 630 toward a distal edge 642. As such, either or both of distal edges 640 and 642 can at least partially define a mounting plane MP (FIG. 13) of support 604 and can, in some cases, be disposed in abutting engagement with surface 268 of base member 236.

One or more wall portions of wall 628 can at least partially define a cavity 644 extending into support 604 from along distal edges 640 and 642. In some cases, one or more connecting wall portions 646 can extend between and operatively interconnect inner and outer side wall portions 634 and 636. It will be appreciated, however, that other configurations and/or arrangements could alternately be used. In the arrangement shown in FIGS. 12-14, surface 632 at least partially defines a recess or cavity (not numbered) formed into support 604 and opening inwardly such that the cavity is facing away from end member 204. In a preferred arrangement, surface 632 and the cavity that is at least partially formed thereby can be dimensioned to receive at least a portion of device mount 602 (e.g., central wall portion 612) and thereby support device mount 602 in spaced relation to base member 236 of end member 204 of gas spring assembly 200.

Retainer 606 is shown as including plate wall 648 having a surface 650 disposed toward damper element 308 and a surface 652 that is opposite surface 650 and disposed toward end member 204. A hole or opening 654 can extend through retainer 606 and can be accessible from along surfaces 650 and 652. Surface 652 is shown as being convex and, in a preferred arrangement, can have a curved cross-sectional profile that can form an approximately semi-spherical shape with a center or pivot point PP3 (FIG. 13).

Securement assembly 608 can include any suitable combination of components and/or features for operatively connecting device mount 602, support 604 and retainer 606 on or along an end member (e.g., end member 204) of gas spring assembly 200. As one example, securement assembly 608 can include a mounting stud 656 that can be secured on or along base member 236 in a suitable manner. In some cases, mounting stud 656 can be dimensioned to be at least partially received within opening 292 in base member 236 and can be secured to the base member by way of a flowed-material joint 658. In such cases, bearing plate 606 can be secured on or along mounting stud 656 in any suitable manner. For example, the mounting stud can extend through opening 654 in bearing plate 606 and receive a corresponding securement device, such as a threaded nut 660, for example. In some cases, a washer 662 or other component can be disposed between threaded nut 660 and surface 650 of plate wall 648.

In a preferred arrangement, mounting assembly 600 is capable of permitting a component of the internally-mounted device (e.g., damper element 308) to pivot, swivel, tilt or otherwise undergo displacement through 360 degrees about and/or around corresponding center or pivot point PP3 (FIG. 13) and relative to an end member (e.g., end member 204) of the gas spring assembly, as is represented in FIG. 13 by arrow PVT. In some cases, such movement may be substantially non-resilient. Additionally, mounting assembly 600 can, in some cases, be capable of permitting a component of the internally-mounted device (e.g. damper element 308) to rotate about end member axis AXM relative to the end member (e.g., end member 204) of the gas spring assembly, as is represented in FIGS. 13 and 14 arrow ROT.

Furthermore, in some cases, mounting assembly 600 may capable of permitting relative displacement in a generally axial direction between an end member (e.g., end member 204) and a component of the internally-mounted device (e.g., damper element 308), as is represented in FIG. 13 by arrow ADP. It will be appreciated that such axial displacement can be provided in any suitable manner. As one example, retainer 606 could be formed from a material capable of flexing, such as a polymeric material, for example, and/or can be urged into engagement with surface 624 of device mount 602 by way of a biasing element 664, such as a coil spring or a frustoconical disk spring, for example. In such cases, axial displacement can be due, at least in part, to deflection (e.g., compression and/or extension and a corresponding recovery) of the retainer and/or biasing element.

In a preferred arrangement, at least surfaces 624 and 626 of central wall portion 612, surface 632 of end wall portion 630 and surface 652 of plate wall 648 can have a curved cross-sectional profile extending between reference points, such as have been described above as reference points PT1 and PT2, for example that can, in some cases, form an approximately semi-spherical surface segment or shape. In such cases, surfaces 632 and 652 can be spaced apart from one another, as is represented in FIG. 13 by reference dimension SP1. As such, a semi-spherical cavity 668 can be formed between surfaces 632 and 652 and can be dimensioned to receive at least a section of end wall portion 612. It will be appreciated that the discussion of circumferential reference lines, reference dimensions, segment height and corresponding radial dimension provided above in connection with mounting assembly 400 may be equally applicable to mounting assembly 600.

Additionally, as shown in FIGS. 12-14, one or more of surfaces 624, 626, 632 and/or 652 can be oriented such that a point through which a lesser cross-sectional dimension extends can be disposed toward the associated end member and a point through which a greater cross-sectional dimension extends can be disposed away from the associated end member. In other cases, a point through which a greater cross-sectional dimension extends can be disposed toward the associated end member and a point through which a lesser cross-sectional dimension extends can be disposed away from the associated end member.

A further example of an assembly AS3 in accordance with the subject matter of the present disclosure, such as may be suitable for use as assemblies 110 in FIG. 1, for example, is shown in FIGS. 15-18. Assembly AS3 includes gas spring assembly 200, gas damper assembly 300, mounting assembly 400, such as have been describe in detail above, as well as another example of an internal misalignment mount in accordance with the subject matter of the present disclosure. The internal misalignment mount is identified in FIGS. 15-18 as mounting assembly 700 and is shown operatively connecting end member 204 of gas spring assembly 200 and damper element 308 of gas damper 300.

Mounting assembly 700 is shown and described herein as including a device mount 702 and a retainer 704 that secures device mount 702 on or along end member 204 of the gas spring assembly. Mounting assembly 700 can also include a bearing assembly 706 operatively disposed between device mount 704 and retainer 704, and a cover 708 operatively connected across an open end of the device mount such that a substantially fluid-tight connection can be formed therewith. In some cases, cover 708 can include a jounce bumper 710 that can impede direct physical contact between damper piston 318 and another one or more components and/or elements of gas spring assembly 200 and/or gas damper assembly 300, such as one or more of end wall 328, base member 236 and/or one or more components and/or features of the internal misalignment mount. It will be appreciated, however, that, in the alternative, device mount 702 and/or jounce bumper 710 could be characterized as being a component of gas damper assembly 300 without departing from the subject matter of the present disclosure. As such, the subject matter of the present disclosure is not intended to be limited to the groupings of components shown and described herein, which are merely exemplary.

Figure 16:
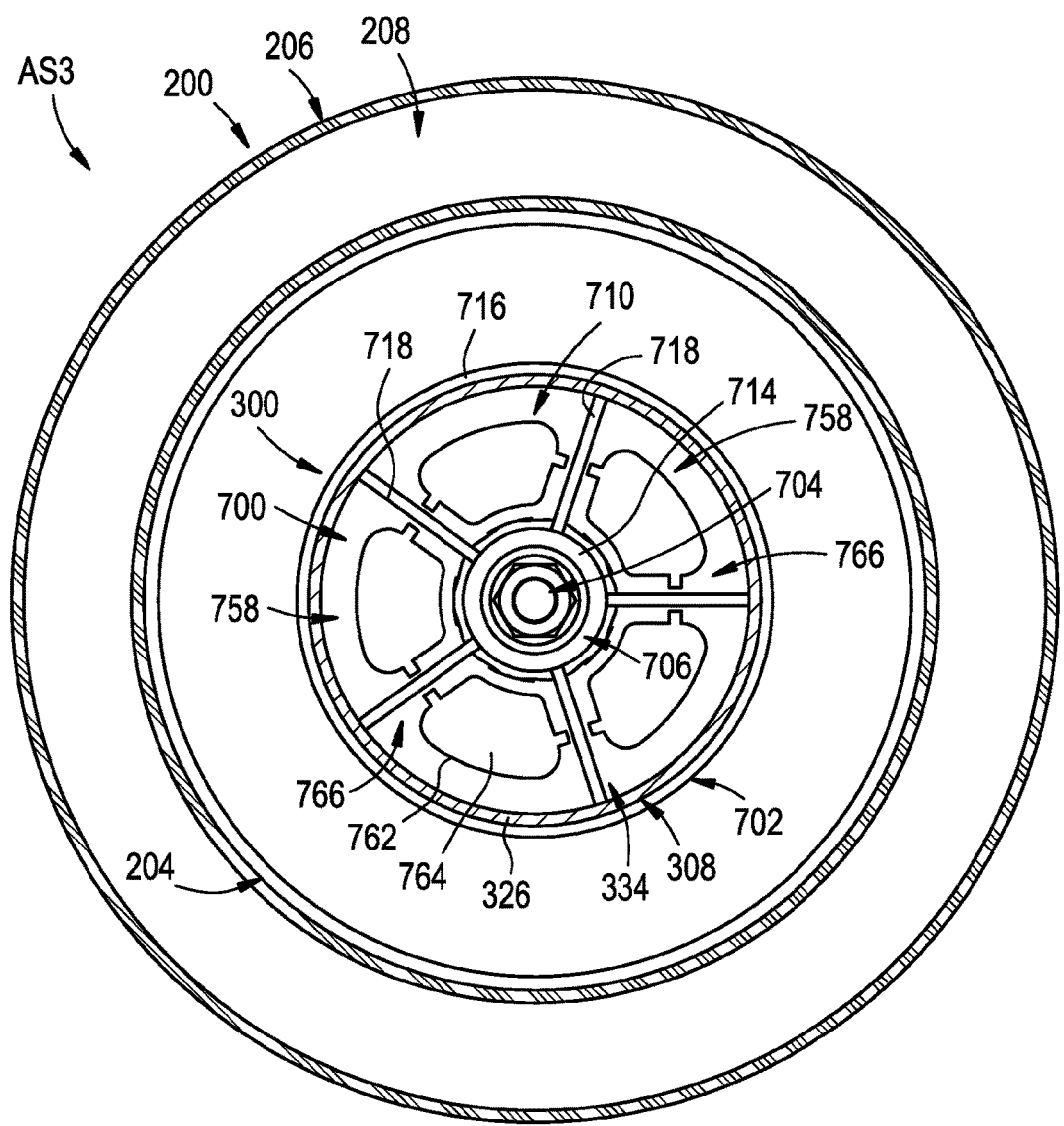
FIG. 16 is a cross-sectional top view of the assembly in FIG. 15 taken from along line 16-16 therein.
Figure 17:
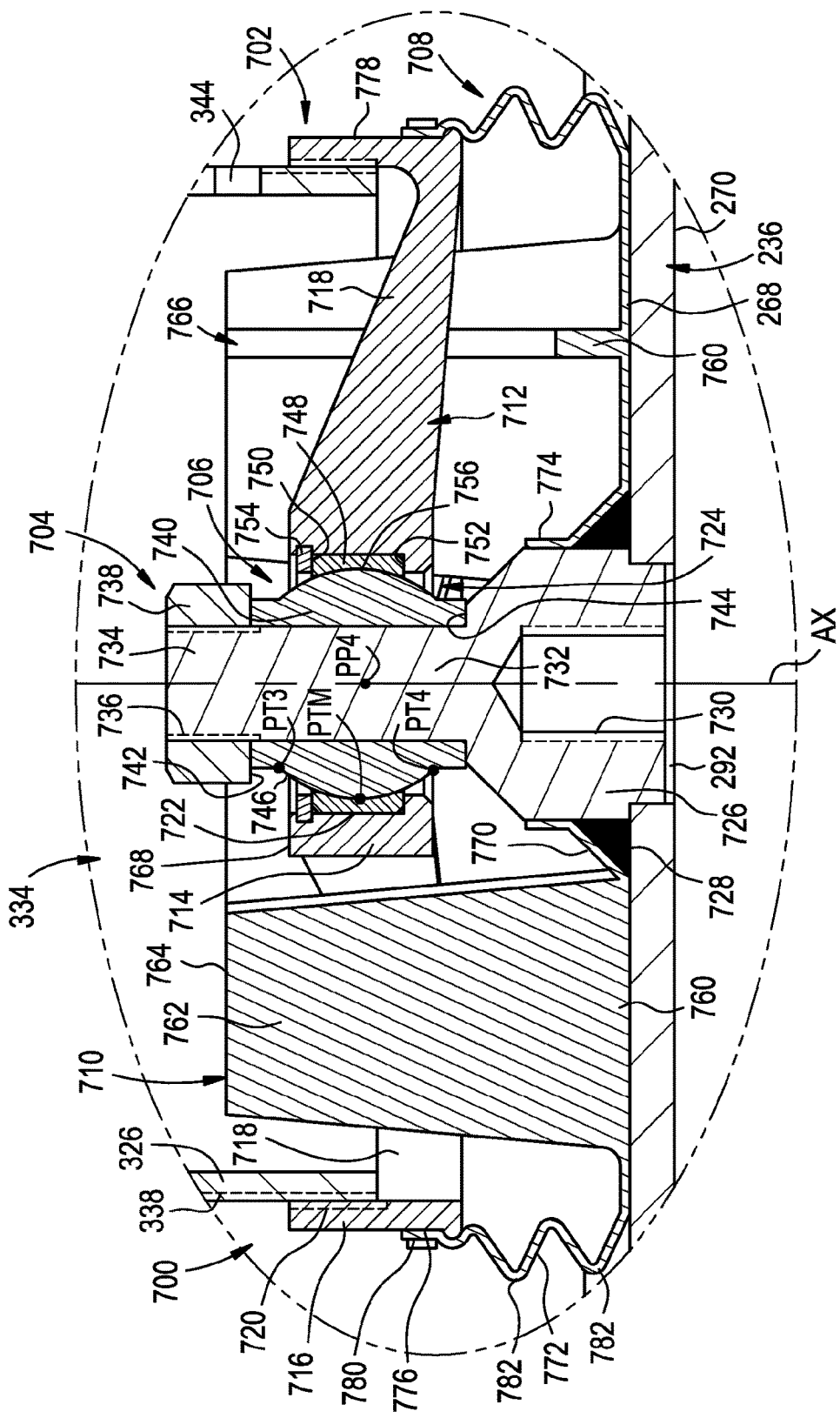
FIG. 17 is an enlarged, cross-sectional view of the portion of the assembly in FIGS. 15 and 16 identified as Detail 17 in FIG. 15.
Figure 18:
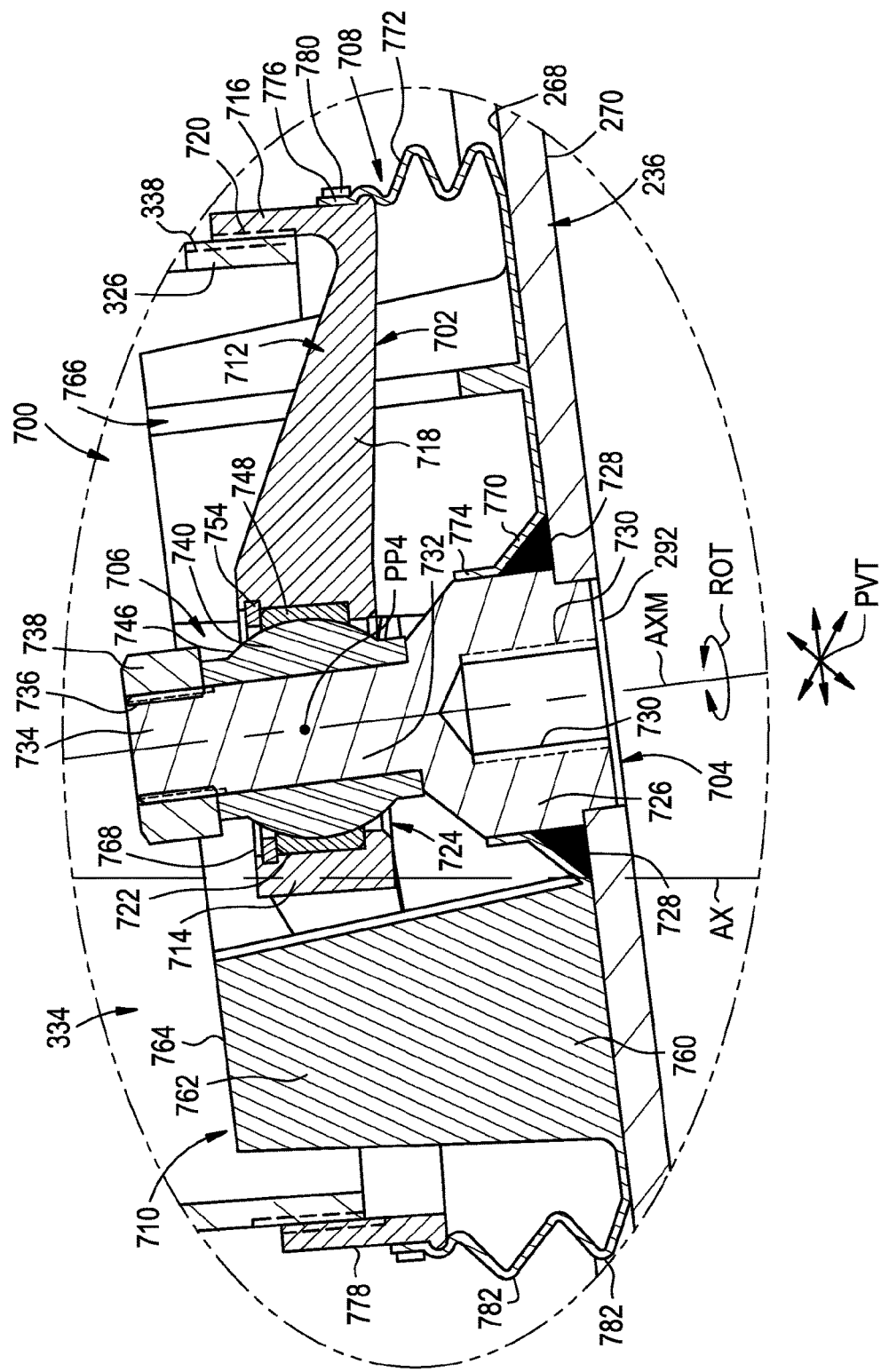
FIG. 18 is an enlarged, cross-sectional view of the portion of the assembly in FIG. 17 shown in a misaligned condition.

As identified in FIGS. 16-18, device mount 702 can include a wall 712 that includes a central wall portion or hub 714, a side wall portion 716, and a plurality of connector wall portions 718 that extend between and operatively interconnect central and side wall portions 714 and 716. Side wall portion 716 can be dimensioned to cooperatively engage at least a portion of side wall 326 of damper element 308. Additionally, device mount 702 can be secured on or along side wall 326 in any suitable manner. As one example, the device mount can be attached to the side wall by way of a flowed-material joint (not shown). As another example, device mount 702 can include one or more helical threads 720 disposed on or along side wall portion 716 that are complementary to helical threads 338 such that a threaded connection (not numbered) can be formed between the device mount and the side wall. It will be appreciated, however, that other configurations and/or constructions could alternately be used.

Central wall portion 714 can include an inside surface 722 that at least partially defines an opening or passage 724 extending through the central wall portion. As shown in FIG. 16, connector wall portions 718 are disposed in spaced relation to one another around axis AX. It will be appreciated that any suitable configuration, arrangement and/or quantity of connector wall portions can be used to operatively interconnect central and side wall portions 714 and 716, such as from two (2) to twenty (20) connector wall portions, for example.

Retainer 704 can include any suitable combination of components and/or features for operatively connecting device mount 702, bearing assembly 706, cover 708 and/or jounce bumper 710 on or along an end member (e.g., end member 204) of gas spring assembly 200. As one example, retainer 704 can include a mounting stud 726 that can be secured on or along base member 236 in a suitable manner. In some cases, mounting stud 726 can be dimensioned to be at least partially received within opening 292 in base member 236 and can be secured to the base member by way of a flowed-material joint 728. It will be appreciated, however, that other configurations and/or arrangements could alternately be used.

Mounting stud 726 can, optionally, include one or more securement features, such as may be suitable for use in operatively connecting mounting assembly 700 and/or end member 204 on or along an associated structural component. As one example, a threaded passage 730 is shown extending into the mounting stud and is accessible through opening 292 in base member 236. Mounting stud 726 can also include a shaft portion 732 that is dimensioned to receive at least a portion of bearing assembly 706 and a securement portion 734 that is adapted to aid in retaining the bearing assembly on or along the shaft portion of the mounting stud. In some cases, securement portion 734 can include one or more helical threads 736 that cooperatively receive a corresponding securement device 738, such as a threaded nut, for example. In this manner, at least a portion of bearing assembly 706 can be secured on or along mounting stud 726.

Bearing assembly 706 can include any suitable combination of components and/or features for operatively connecting device mount 702 and retainer 704 such that mounting assembly 700 is capable of permitting a component of the internally-mounted device (e.g., damper element 308) to pivot, swivel, tilt or otherwise undergo displacement through 360 degrees about or around corresponding center or pivot point PP4 (FIG. 18) and relative to an end member (e.g., end member 204) of the gas spring assembly, as is represented in FIGS. 17 and 18 by arrow PVT. In some cases, such movement may be substantially non-resilient. Additionally, bearing assembly 706 can configured to operatively connect device mount 702 and retainer 704 such that mounting assembly 700 can, in some cases, be capable of permitting a component of the internally-mounted device (e.g. damper element 308) to rotate about end member axis AXM relative to the end member (e.g., end member 204) of the gas spring assembly, as is represented in FIGS. 17 and 18 arrow ROT.

As one example of a suitable construction, bearing assembly 706 is shown in FIGS. 15-18 as including an inner bearing element 740 that can extend longitudinally between opposing end surfaces 742 and 744 and can include an inner surface (not identified) that at least partially defines a passage or hole (not identified) dimensioned to receive shaft portion 732 of mounting stud 726. In a preferred arrangement, inner bearing element 740 can be disposed along mounting stud 726 with end surfaces 742 and 744 captured between the mounting stud and securement device 738 such that the inner bearing element can be axially retained in a substantially fixed position relative to end member 204.

Inner bearing element 740 can also include a bearing surface 746 that is shown as being convex. In a preferred arrangement, bearing surface 746 can have a curved cross-section profile extending outwardly from a hemispherical or mid-point PTM to reference points PT3 and PT4. In some cases, bearing surface 746 can form an approximately semi-spherical surface segment, such as may have circumferential reference lines, reference dimensions, a segment height and/or a corresponding radial dimension, such as have been discussed above in connection with mounting assembly 400, for example.

Bearing assembly 706 can also include an outer bearing element 748 that can extend longitudinally between opposing end surfaces 750 and 752. In a preferred arrangement, outer bearing element 748 can be received within passage 724 of device mount 702 with end surface 752 disposed in abutting engagement with a shoulder (not numbered) of central wall portion 714 and end surface 750 engaged by a securement device 754, such as a snap or retaining ring, for example. Additionally, outer bearing element 748 can include an outer surface (not numbered) disposed along inside surface 722 of central wall portion 714. Outer bearing element 748 can further include a bearing surface 756 that is shown as being concave, and can have a curved cross-sectional profile that can at least partially form a recess (not numbered) within the outer bearing element. In a preferred arrangement, bearing surface 756 and the recess formed thereby can be dimensioned to receive at least a portion of bearing surface 746 of inner bearing element 740. In this manner, inner bearing element 740 can be captured within outer bearing element 748 such that pivotal displacement PVT and/or rotational displacement ROT between end member 204 and a component of the internally-mounted device (e.g., damper element 308) can be provided, such as has been discussed above.

It will be recognized and appreciated that during use mounting assemblies 400, 500, 600 and 700 can transfer forces and loads associated with normal usage of the internally-mounted device (e.g., gas damper assembly 300) into an associated end member, such as one of end members 202 and 204, for example. In some cases, however, the internally-mounted device may undergo displacement or conditions of use (e.g., full jounce conditions) during which impact forces or other loading conditions could be generated that have a substantially increased magnitude in comparison with forces and loads associated with normal usage of the internally-mounted device. In some cases, it may be desirable to avoid transferring such substantially-increased loads into and through the mounting assembly. Instead, such forces and/or load conditions can be transmitted through to the associated end member (e.g., end member 204) such that one or more components of the mounting assembly (e.g., device mount 702, retainer 704 and/or bearing assembly 706) can be substantially isolated from the impact forces and/or other load conditions.

It will be appreciated that such a construction can include any suitable combination of features and/or components. For example, gas damper assembly 300 includes a damper piston 316 that can be displaced during jounce conditions in a direction toward end member 204 and mounting assembly 700. Device mount 702 includes a plurality of openings or passages 758 formed between adjacent ones of connector wall portions 718. Jounce bumper 710 can include a bumper base portion 760 and a plurality of bumper segments 762 that extend axially from along bumper base portion 760 toward distal end surfaces 764. Bumper segments 762 are spaced apart from one another such that a plurality of gaps 766 are formed around jounce bumper 710 with one gap formed between adjacent bumper segments 762.

Device mount 702 is shown as including a surface 768 that can form an axial extent of at least a portion of the device mount. In a preferred arrangement, connector wall portions 718 and gaps 766 are at least approximately rotationally aligned with one another. Jounce bumper 710 can supported along end member 204 such that bumper segments 762 project through passages 758 and distal end surfaces 764 are disposed along an opposing side of device mount 702 relative to base member 236. In this manner, upon reaching a full jounce condition, damper piston 318 can contact distal end surfaces 764 of bumper segments 762 and the forces associated with such displacement can be transferred through the jounce bumper and into base member 236 of end member 204. In this manner, components such as device mount 702, retainer 704 and bearing assembly 706 can be isolated from such forces and conditions of use.

In some cases, the internally-mounted device may include one or more pressurized gas chambers or other volumes of pressurized gas. In such cases, use of a device mount that includes one or more openings or passages for jounce bumper segments, such as device mount 702, for example, may permit undesirable pressurized gas flow and/or other fluid communication to, from and/or between one of the pressurized gas chambers and another volume. In such cases, mounting assembly 700 can include flexible cover 708 that can include one or more wall portions that are operatively connected on, along or otherwise between two or more components such that a substantially fluid-tight connection can be formed therebetween.

Figure 15:
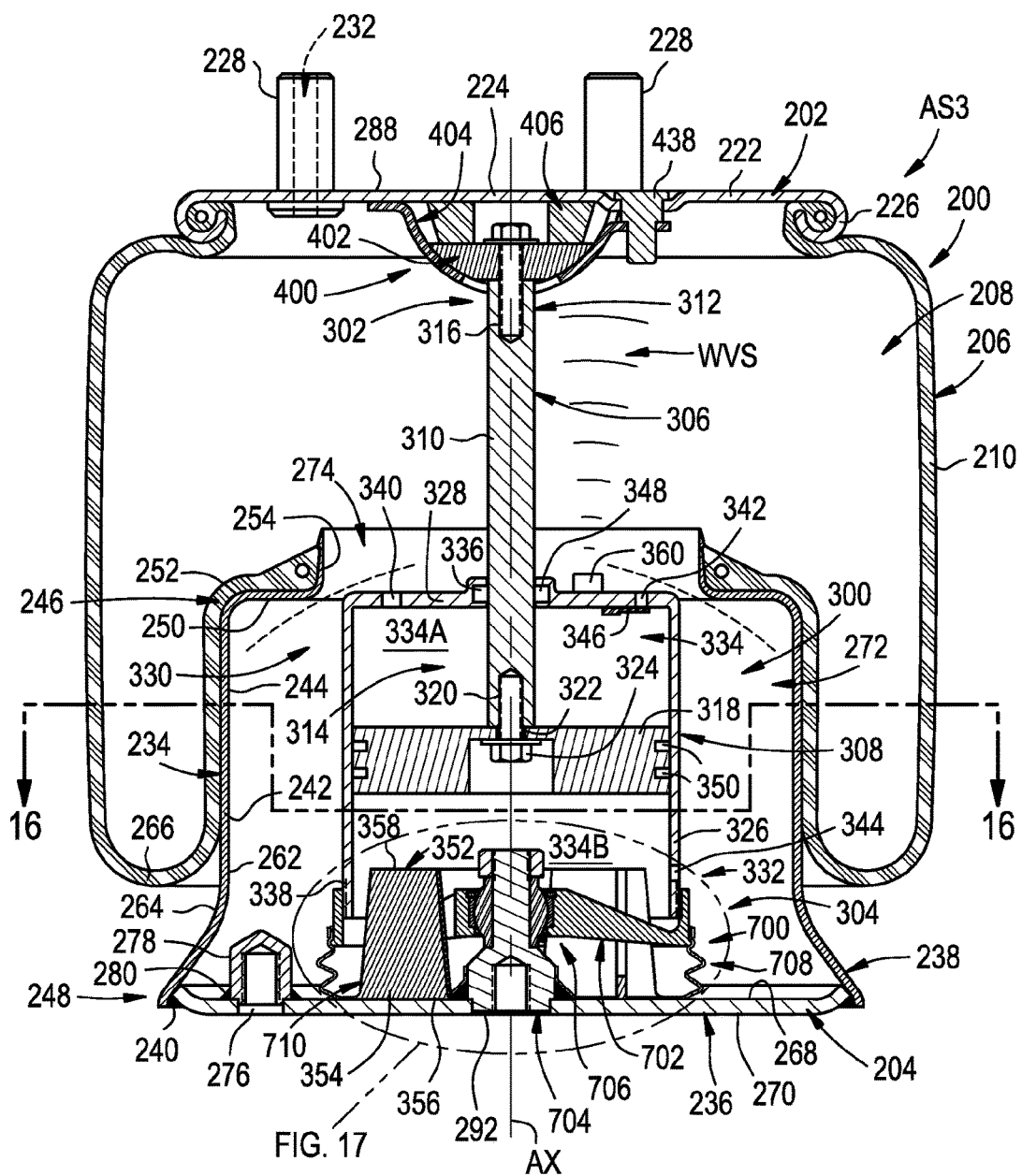
FIG. 15 is a cross-sectional side view of a further example of an assembly including an internal misalignment mount in accordance with the subject matter of the present disclosure.

It will be appreciated that flexible cover 708 can be of any suitable, kind and/or configuration, and can be formed from any suitable material or combination of materials. As one example, flexible cover 708 can include a cover wall portion 770 that extends between retainer 704 and base member 236, and a cover wall portion 772 that extends between device mount 702 and base member 236. In some cases, cover wall portions 770 and/or 772 can take the form of separate wall sections that are independently provided and secured between the associated components. In other cases, the cover wall portions can be formed from a common wall section that is connected between two or more components. In still other cases, such as is shown in FIGS. 15, 17 and 18, for example, cover wall portions 770 and 772 can extend from and, in some cases, be commonly formed with or otherwise attached to bumper base portion 760.

In any of such cases, cover wall portions 770 and 772 can respectively extend to edge portions 774 and 776. In the arrangements shown in FIGS. 15, 17 and 18, edge portion 774 is disposed along mounting stud 726 and edge portion 776 is secured along an outer surface 778 of side wall portion 716. It will be appreciated that the edge portions can be secured on or along the associated components in any suitable manner. As one example, edge portion 774 can be attached to mounting stud 726 by way of a flowed-material joint (not shown), such as an adhesive joint, for example. As another example, edge portion 776 can be secured on or along outer surface 778 of side wall portion 716 by way of a retaining band 780.

It will be appreciated that flexible cover 708 can be formed from any suitable serial or combination of materials, such as one or more of natural rubber, synthetic rubber and/or thermoplastic elastomeric (e.g., polyurethane). In some cases, one or more of cover wall portions 770 and 772 can include one or more pleats, convolutions 782 or other geometric features suitable for promoting extension or stretching of the cover wall portion. Additionally, in some cases, flexible cover 708 and jounce bumper 710 can be formed from a unitary mass of material, such as is illustrated in FIGS. 15, 17 and 18, for example.

In some cases, conventional spherical bearings can have a comparatively large cross-sectional dimension in the axial direction and, as such, can consume relatively large amounts of space in assemblies that include such conventional spherical bearings. Additionally, a relatively high cost can also be associated with the use of conventional spherical bearings. In other cases, bearing designs that include compliant polymer bushings that are constructed to withstand substantial axial loads will often permit excessive axial deflection and can also generate significant reaction moments with increased angular misalignment.

The subject matter of the present disclosure includes constructions in which a misalignment joint can, in some cases, have a lower profile and/or smaller axial height. For example, dimensions in the axial direction can be minimized or at least reduce, which allows space for other components and can reduce the possibility of interference between components or other design challenges. In some cases, the constructions can incorporate multiple functions into the components to assist in reducing cost. For example, bearing areas can be maximized or at least increased such that higher axial loads are attainable and/or materials having lower performance characteristics and/or costs can be used. In some cases, the constructions can also increase the distance the pivot point is located from the mounting surface such that misalignment angles can be maximized or at least increased. Depending on the application, such an offset pivot can result in more favorable movements of the mounted devices due to increased clearances.

The constructions have at least one bearing surface interface that permits displacement in at least one direction. Each interface has bearing surfaces that approximately share instant centers of rotation with profiles that could be, but are not limited to, continuous or intermittent cylindrical or spherical geometries. In some cases, the interfaces can have materials and/or surface treatments, such as may be suitable for minimizing or at least reducing friction and/or wear. As indicated above, non-limiting examples of suitable materials and/or linings can include polyamide compounds, polyethylene compounds, polytetrafluoroethylene compounds and/or polyoxymethylene compounds as well as other materials impregnated or filled with lubricating oils or compounds, such as molybdenum disulfide, for example.

In some cases, one such bearing surface can be located on a support component. The support component could be part of a gas spring end member or a separate component fastened to the end member. In some cases, the support can be designed to handle the axial loads of the device being mounted within the gas spring, such as a damper, for example. In some cases, spring loads can be carried by the spring, and a device mount can be provided for mounting the internal device that undergoes angular misalignment relative to the gas spring end members. The device mount can be in contact with the bearing surface of the support and can have a corresponding bearing surface of similar and complementary geometry that permits displacement in at least one direction. In an assembled condition, a spring or other biasing element can be deformed such that a load is applied that forces the bearing surfaces into contact with one another to form the interface.

The spring or other biasing element can be of any suitable type or kind, such as a metal spring or a compliant polymer element. In some cases, contact at the interface can be generally maintained during use. In other cases, contact can be disrupted if the force of the spring element is overcome. These constructions can also be combined with other misalignment devices to further the misalignment capabilities of the assemblies. Additionally, these constructions can be used to provide a predetermined misalignment that is set or occasionally adjusted, either manually or automatically, during use. In some cases, the construction may not articulate if the force of the spring or other biasing element is intentionally high, such as if a fastener is used as the spring element, which would have a relatively high spring constant.

The subject matter of the present disclosure can include constructions in which a separate feature or load path is provided to transmit excess axial forces and/or loads to an end member of the assembly. That is, such constructions can divide the load paths of the components such that the components can be more efficiently designed with respect to material, space and/or cost. For example, bumper features in a parallel load path can be constructed to carry excess loads. In gas damper applications, a bearing element or assembly could be used to provide angular misalignment and to sustain loads associated with the pressurized gas damper. In such cases, a bumper can be included that can transmit axial forces and/or loads to an associated end member apart from the bearing element or assembly.

For example, in some cases, a gas spring assembly can have an internal device that attaches to an end member. The internal device can be fastened to the end member through a mounting assembly that has a joint that permits angular misalignment. One or more bumper segments can be situated beside, arrayed around or otherwise off-axis of the joint such that the device mount and bumper segments have parallel load paths to the end member of the gas spring. The device mount may not contact the bumper segments even when undergoing some degree of angular misalignment. When another component of the gas spring or mounted device approaches the joint, such as in jounce travel, for example, the component contacts one or more of the bumper segments before contact is made with the device mount having the joint.

Additionally, if the internal device operates under sealed conditions, a deformable membrane can be affixed to the device such that the membrane defines part of the boundary volume of the internal device. The deformable membrane can include one or more pleats or convolutions to facilitate deformation and minimize this advantageous reaction moments, which can result from angular misalignment. In some cases, the deformable membrane could be included with the bumper segments as a unitary molded polymer component. In other cases, the deformable membrane could be a separate component from the bumper segments or could be molded over one or more of the bumper segments and made from different materials. In some cases, guide features could be designed into the bumper segments or into the device mount to facilitate relative radial alignment during assembly and/or operation.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. An assembly comprising:
    a gas spring including:
        a flexible spring member having a longitudinal axis, said flexible spring member extending longitudinally between first and second ends and peripherally about said longitudinal axis to at least partially define a spring chamber;
        a first end member secured in a substantially fluid-tight manner across said first end; and,
        a second end member disposed in spaced relation to said first end member and secured in a substantially fluid-tight manner across said second end; and,
        an internally-mounted device at least partially disposed within said spring chamber of said gas spring and operatively connected between said first and second end members; and,
        a first mounting assembly operatively connecting said internally-mounted device to one of said first and second end members such that said internally-mounted device can undergo 360 degree pivotal movement about a pivot point and 360 degree rotational displacement relative to said one of said first and second end members;
        wherein said first mounting assembly includes a device mount operatively secured to said internally-mounted device adjacent said one of said first and second end members, a retainer rigidly secured to said one of said first and second end members and operatively retaining said device mount adjacent said one of said first and second end members; and a support disposed between said device mount and said one of said first and second end members such that said device mount is supported in spaced-apart relation to said one of said first and second end members, said support and said retainer capturing therebetween at least a portion of said device mount.

2. An assembly according to claim 1, wherein said device mount includes a wall with a first wall portion including a first semi-spherical surface with one of a concave shape and a convex shape.

3. An assembly according to claim 2, wherein said retainer includes a wall with a first wall portion including a first semi-spherical surface with the other of said concave shape and said convex shape.

4. An assembly according to claim 3, wherein said semi-spherical surface of said first wall portion of said device mount and said semi-spherical surface of said first wall portion of said retainer are disposed in facing relation to one another and cooperatively engage one another such that said semi-spherical surfaces can be slidingly displaced relative to one another to permit said 360 degree pivotal and rotational displacement of said internally-mounted device relative to said one of said first and second end members.

5. An assembly according to claim 1, wherein said first wall portion of said wall of said retainer has an approximately uniform thickness such that said first wall portion has a second semi-spherical surface opposite said first semi-spherical surface.

6. An assembly according to claim 1, wherein said support includes a wall with a first wall portion including a first semi-spherical surface with the other of said concave shape and said convex shape.

7. An assembly according to 6, wherein said first semi-spherical surface of said retainer and said first semi-spherical surface of said support are disposed in space-apart relation to one another such that semi-spherical gap is disposed therebetween.

8. An assembly according to claim 7, wherein said first wall portion of said wall of said device mount has an approximately uniform thickness such that said first wall portion has a second semi-spherical surface opposite said first semi-spherical surface with at least some of said first wall portion received within said semi-spherical gap between said retainer and said support, said retainer and said support are engaged with opposite sides of the device mount.

9. An assembly according to claim 1, wherein said support is a substantially rigid support maintaining pivotal movement of said semi-spherical surface of said device mount about a substantially-fixed pivot point relative to at least one of said retainer and said one of said first and second end members.

10. An assembly according to claim 9, wherein said support substantially inhibits axial displacement of said device mount relative to said one of said first and second end members.

11. An assembly according to claim 1, wherein said support includes one or more biasing elements operative to urge said semi-spherical surface of said first wall portion of said device mount into abutting engagement with said semi-spherical surface of said first wall portion of said retainer.

12. An assembly according to claim 1, further comprising a second mounting assembly operatively connecting said internally-mounted device to the other of said first and second end members such that said internally-mounted device can undergo 360 degree pivotal and rotational displacement relative to the other of said first and second end members.

13. An assembly according to claim 12, wherein at least one of said first and second mounting assemblies is a resilient mounting assembly operative to undergo resilient deflection.

14. An assembly according to claim 12, wherein at least one of said first and second mounting assemblies is a non-resilient mounting assembly operative to undergo substantially non-resilient deflection.

15. An assembly according to claim 1, wherein said internally-mounted device is one of a rebound limiter, a sensing device and a damping member.

16. An assembly according to claim 15, wherein said internally-mounted device is said damping member and includes a first damper element and a second damper element that are telescopically interengaged with one another for relative reciprocal motion with at least one of said first and second damper elements including a damping chamber including a quantity of at least one of a liquid and a pressurized gas as a working medium.

* * * * *